United States Patent
Oka et al.

(10) Patent No.: US 10,717,831 B2
(45) Date of Patent: Jul. 21, 2020

(54) TWO-COMPONENT TYPE EPOXY RESIN COMPOSITION FOR FIBER-REINFORCED COMPOSITE MATERIAL, AND FIBER-REINFORCED COMPOSITE MATERIAL

(71) Applicant: Toray Industries, Inc., Tokyo (JP)

(72) Inventors: Hideki Oka, Aichi (JP); Nobuyuki Tomioka, Aichi (JP); Shiro Honda, Aichi (JP)

(73) Assignee: Toray Indusries, Inc., Tokyo (JP)

( * ) Notice: Subject to any disclaimer, the term of this patent is extended or adjusted under 35 U.S.C. 154(b) by 76 days.

(21) Appl. No.: 15/562,002

(22) PCT Filed: Mar. 25, 2016

(86) PCT No.: PCT/JP2016/059635
§ 371 (c)(1),
(2) Date: Sep. 27, 2017

(87) PCT Pub. No.: WO2016/158757
PCT Pub. Date: Oct. 6, 2016

(65) Prior Publication Data
US 2018/0057645 A1    Mar. 1, 2018

(30) Foreign Application Priority Data

Mar. 27, 2015 (JP) ................. 2015-066657
Jun. 26, 2015 (JP) ................. 2015-128657

(51) Int. Cl.
*C08J 5/04* (2006.01)
*C08J 5/10* (2006.01)
*B29C 70/48* (2006.01)

(52) U.S. Cl.
CPC .............. *C08J 5/042* (2013.01); *C08J 5/043* (2013.01); *C08J 5/10* (2013.01); *B29C 70/48* (2013.01); *C08J 2363/00* (2013.01); *C08J 2463/00* (2013.01)

(58) Field of Classification Search
CPC ..... C08J 5/042; C08J 5/043; C08J 5/10; C08J 2363/00; C08J 2463/00; B29C 70/48
USPC .......................................................... 523/428
See application file for complete search history.

(56) References Cited

U.S. PATENT DOCUMENTS

| | | | | |
|---|---|---|---|---|
| 6,124,381 | A * | 9/2000 | Miyake | C08G 59/42 523/461 |
| 6,613,839 | B1 * | 9/2003 | Gan | C08G 59/18 525/117 |
| 2005/0261397 | A1 * | 11/2005 | Ito | C08G 59/24 523/400 |
| 2009/0030158 | A1 | 1/2009 | Amano et al. | |
| 2009/0131556 | A1 | 5/2009 | Honda et al. | |
| 2010/0166971 | A1 * | 7/2010 | Wittenbecher | C08G 59/686 427/444 |
| 2010/0171146 | A1 * | 7/2010 | Takeuchi | C08G 59/42 257/100 |
| 2012/0299039 | A1 * | 11/2012 | Uchida | H01L 23/296 257/98 |
| 2013/0303661 | A1 * | 11/2013 | Oka | C08J 5/24 523/468 |

FOREIGN PATENT DOCUMENTS

| | | |
|---|---|---|
| JP | 57-133123 | 8/1982 |
| JP | 01-272657 | 10/1989 |
| JP | 06-256473 | 9/1994 |
| JP | 2006-206862 | 8/2006 |
| JP | 2010-106131 | 5/2010 |
| JP | 2012-144831 | 8/2012 |
| WO | 2007/125759 A1 | 11/2007 |
| WO | 2009/014270 A1 | 1/2009 |

* cited by examiner

*Primary Examiner* — David T Karst
(74) *Attorney, Agent, or Firm* — DLA Piper LLP (US)

(57) ABSTRACT

A two-component type epoxy resin composition for a fiber reinforced composite material is a two-component type epoxy resin composition for a fiber reinforced composite material that includes the following components [A] to [C], wherein the content of the component [C] is 6 to 25 mass parts relative to 100 mass parts of the component [A]. The fiber reinforced composite material is a fiber reinforced composite material made by combining and curing the two-component type epoxy resin composition for the fiber reinforced composite material and a reinforcing fiber, [A]: an epoxy resin, [B]: an acid anhydride and [C]: a quaternary ammonium salt or a quaternary phosphonium halide or an imidazolium salt.

8 Claims, No Drawings

TWO-COMPONENT TYPE EPOXY RESIN COMPOSITION FOR FIBER-REINFORCED COMPOSITE MATERIAL, AND FIBER-REINFORCED COMPOSITE MATERIAL

TECHNICAL FIELD

This disclosure relates to a two-component type epoxy resin composition for use in fiber reinforced composite material and a fiber reinforced composite material that uses the two-component type epoxy resin composition.

BACKGROUND

Fiber reinforced composite materials made up of reinforcing fibers and matrix resins allow material designs that make use of advantages of the reinforcing fibers and the matrix resins so that their use is being expanded to not only the aerospace field but also the field of sports, the field of general industry and the like.

As reinforcing fibers, glass fiber, aramid fiber, carbon fiber, boron fiber are used. Furthermore, as matrix resins, both thermosetting resins and thermoplastic resins are used, but thermosetting resins that can easily impregnate the reinforcing fiber are often used. As thermosetting resins, epoxy resins, unsaturated polyester resins, vinyl ester resins, phenol resin, bis-maleimide resins and the like are used.

For production of fiber reinforced composite materials, methods such as a prepreg process, a hand layup process, a filament winding process, a pultrusion process, and a RTM (resin transfer molding) process, are applied.

In recent years, as environment regulations for motor vehicles have been becoming stricter worldwide, domestic and foreign motor vehicle makers have been working on weight reduction of vehicle bodies, which influences fuel economy performance. In particular, application of carbon fiber composite materials, whose masses are half that of iron and about 70 percent of that of aluminum, is being actively considered. Various component members for motor vehicles are required to have lighter weights and also high rigidity and strength characteristics, and often have three-dimensional complicated shapes.

Therefore, the RTM process, which uses a high-rigidity and high-strength carbon fiber as a continuous fiber and is capable of coping with complicated shapes, is an effective forming method. The RTM process is a method of obtaining a fiber reinforced composite material by closing an upper mold after a substrate made of reinforcing fiber is disposed, injecting a matrix resin through a resin injection opening to impregnate the reinforcing fiber, then curing the resin, opening the upper mold, and extracting the molded product. A major issue for wider application of carbon fiber composite materials to motor vehicles is productivity. This poses an impediment such that carbon fiber composite materials have been only adopted in some high-class automobiles.

In the hand layup process, the filament winding process, the pultrusion process, and the RTM process, two-component type epoxy resin compositions are often used from the viewpoint of forming processability. The two-component type epoxy resin composition is an epoxy resin composition stored in a state in which a base compound liquid containing epoxy resin as a main component and a curing agent liquid containing a curing agent as a main component are put in separate containers and, immediately before use, the two liquids, the base compound liquid and the curing agent liquid, are mixed for use.

In contrast, an epoxy resin composition handled in a state in which all the components, including a base compound and a curing agent, are mixed in one is termed one-liquid type epoxy resin composition. In a one-liquid type epoxy resin composition, refrigerated storage is needed because a curing reaction progresses during storage. Furthermore, a less reactive solid curing agent is often selected and, to impregnate a reinforcing fiber with such a one-liquid type epoxy resin composition, the one-liquid type epoxy resin composition needs to be pushed in with high pressure by using a press roll or the like.

On the other hand, in the two-component type epoxy resin composition, since both a base compound liquid and a curing agent liquid are provided in liquid form, an epoxy resin composition obtained by mixing the base compound liquid and the curing agent liquid can be provided in a liquid form with low viscosity so that impregnation of reinforcing fiber is easy. Furthermore, since the base compound liquid and the curing agent liquid can be separately stored, long-term storage thereof is possible without any particular restriction on storage conditions.

To realize a high-level productivity as mentioned above, for example, in the RTM process, it is specifically required not only that the resin's curing time be short but also that four conditions (tasks) as follows be simultaneously satisfied. First, after being mixed and prepared, the epoxy resin composition shall be stable in viscosity for a long time with the viscosity being inhibited from increasing during storage at a low temperature of 40° C., that is, be excellent in the viscosity stability at 40° C. Second, in the step of injecting the resin into the reinforcing fiber substrate, the epoxy resin composition shall be low in viscosity and, during the injection step, increase in viscosity shall be inhibited and therefore the resin composition shall be excellent in impregnating ability. Third, sufficient high-speed curing can be achieved in an intermediate-temperature range around 120° C., thereby allowing simplification of the forming equipment and eliminating the need for heat resistance of subsidiary materials and the like. Furthermore, the resin itself shall not become colored so that both cost reduction and formed product quality can be favorably achieved. Fourth, in the mold release step after molding, the resin shall have attained sufficient rigidity due to curing and can be released from the mold smoothly without causing strain. Furthermore, strain or deformation will not result even from a painting step.

For these tasks, an epoxy resin composition (Japanese Unexamined Patent Publication (Kokai) No. HEI 6-256473) for optical uses that combines an acid anhydride as a curing agent and an ammonium organic acid salt as an accelerating agent and has intermediate-temperature rapid curability but no metal corrosiveness, an epoxy resin composition (Japanese Unexamined Patent Publication (Kokai) No. 2006-206862) in which an acid anhydride as a curing agent and a quaternary phosphonium salt as an accelerating agent are combined and the coloration during heated cure is inhibited, and an epoxy resin composition (Japanese Unexamined Patent Publication (Kokai) No. 2010-106131) that uses a non-aromatic based acid anhydride based curing agent as an alicyclic epoxy, and a salt of a quaternary phosphonium cation and an organic sulfonic acid anion as an accelerating agent and is excellent in ultraviolet radiation resistance and heat yellowing resistance are disclosed.

Furthermore, an epoxy resin composition excellent in the balance between the low-viscosity retention time and the curing time in a constant temperature condition around 100° C. due to use of an epoxy resin composition that combines an acid anhydride as a curing agent and an organophosphorus compound as an accelerating agent is disclosed (International Publication 2007/125759 pamphlet).

The materials described in Japanese Unexamined Patent Publication (Kokai) No. HEI 6-256473, Japanese Unexamined Patent Publication (Kokai) No. 2006-206862 and Japanese Unexamined Patent Publication (Kokai) No. 2010-106131 do not sufficiently achieve high-speed curing. The materials described in International Publication 2007/125759 pamphlet have a problem that the cured product becomes colored when molding is carried at high temperature to shorten the curing time.

Accordingly, it could be helpful to provide a two-component type epoxy resin composition that overcomes shortcomings of the foregoing conventional technology and is excellent in the viscosity stability at a low temperature (e.g., 40° C.) of an epoxy resin composition after the mixing preparation, retains low viscosity at the time of injection into reinforcing fiber and is excellent in impregnating property, cures in a short time during forming, and gives a fiber reinforced composite material high in the transparency of a cured product and excellent in formed product quality, and a fiber reinforced composite material made by using the two-component epoxy resin composition.

SUMMARY

We thus provide: One mode of the two-component type epoxy resin composition for a fiber reinforced composite material (referred to as Example 1) is a two-component type epoxy resin composition for a fiber reinforced composite material comprising a component [A] to a component [C] as follows, wherein a content of the component [C] is 6 to 25 mass parts relative to 100 mass parts of the component [A].
component [A]: an epoxy resin
component [B]: an acid anhydride
component [C]: a quaternary ammonium salt or a quaternary phosphonium halide or an imidazolium salt
Preferably, the component [C] is the quaternary ammonium halide.
Preferably, the component [C] is quaternary phosphonium bromide.
Preferably, the component [C] is a tetraphenylphosphonium halide.
Preferably, the component [C] is a imidazolium halide.
Furthermore, another mode of the two-component type epoxy resin composition for a fiber reinforced composite material (referred to as Example 2) is a two-component type epoxy resin composition for a fiber reinforced composite material comprising a component [A] and a component [B] as follows and has a temperature T1 at which a viscosity occurring after 5 minutes following mixture of all components is greater than or equal to 1.5 times and less than or equal to 4.0 times the viscosity occurring after 1 minute following the mixture and the viscosity occurring after 20 minutes following the mixture is greater than or equal to 1.0 time and less than or equal to 2.0 time the viscosity occurring after 5 minutes following the mixture, and wherein the temperature T1 is greater than or equal to 30° C. and less than or equal to 60° C.
component [A]: an epoxy resin
component [B]: an acid anhydride
Preferably, the two-component type epoxy resin composition further comprises a quaternary phosphonium halide as a component [C].
Preferably, a content of the component [C] is 6 to 25 mass parts relative to 100 mass parts of the component [A].

Preferably, the component [C] is quaternary phosphonium bromide.
Preferably, the component [C] is a tetraphenylphosphonium halide.
Preferably, the two-component type epoxy resin composition further comprises a component [D] reinforcing fiber. Incidentally, Example 1 and Example 2 are sometimes collectively termed invention in a simplified manner, which applies hereinafter as well.
Preferably, the component [D] is a carbon fiber.
Preferably, the component [B] is an acid anhydride having an alicyclic structure.
Furthermore, the fiber reinforced composite material is made by curing the foregoing two-component type epoxy resin composition for a fiber reinforced composite material.

We thus provide a two-component type epoxy resin composition for a fiber reinforced composite material excellent in the viscosity stability at low temperature (e.g., 40° C.) of an epoxy resin composition after the mixing preparation, retains low viscosity at the time of injection into reinforcing fiber and is excellent in impregnating property, cures in a short time at the time of forming, is excellent in heat resistance, and makes it possible to provide at high productivity a fiber reinforced composite material that is high in transparency and excellent in formed product quality.

Furthermore, because the two-component type epoxy resin composition for a fiber reinforced composite material cures in a short time at the time of forming and gives a high-quality fiber reinforced composite material, it becomes possible to provide a high-quality fiber reinforced composite material at high productivity by the RTM process or the like. This promotes application of the fiber reinforced composite material particularly to motor vehicle usage so that fuel economy improvement by further weight reduction of motor vehicles and contribution to reduction of global warming gas emissions can be expected.

DETAILED DESCRIPTION

Desirable examples of the two-component type epoxy resin composition for a fiber reinforced composite material will be described in detail.

The two-component type epoxy resin composition for a fiber reinforced composite material of Example 1 includes a component [A] to a component [C] as follows, wherein a content of the component [C] is 6 to 25 mass parts relative to 100 mass parts of the component [A].
component [A]: an epoxy resin
component [B]: an acid anhydride
component [C]: a quaternary ammonium salt, a quaternary phosphonium halide, or an imidazolium salt
First, the components of the two-component type epoxy resin composition for a fiber reinforced composite material of Example 1 will be described.

Component [A]: Epoxy Resin

The component [A] is an epoxy resin. The epoxy resin means a compound that has two or more epoxy groups in one molecule.

As concrete examples of the component [A], aromatic glycidyl ethers obtained from a phenol having a plurality of hydroxyl groups, aliphatic glycidyl ethers obtained from an alcohol having a plurality of hydroxyl groups, glycidyl amines obtained from an amine, epoxy resins having an oxirane ring, glycidyl esters obtained from a carboxylic acid having a plurality of carboxyl groups and the like can be cited.

As examples of aromatic glycidyl ethers that can be used as the component [A], for example, diglycidyl ethers obtained from bisphenols, such as diglycidyl ethers of bisphenol A, diglycidyl ethers of bisphenol F, diglycidyl ethers of bisphenol AD, diglycidyl ethers of bisphenol S, etc., polyglycidyl ethers of novolacs obtained from phenols, alkyl phenol, etc., diglycidyl ethers of resorcinol, diglycidyl ethers of hydroquinone, diglycidyl ethers of 4,4'-dihydroxy-biphenyl, diglycidyl ethers of 4,4'-dihydroxy-3,3',5,5'-tetramethyl biphenyl, diglycidyl ethers of 1,6-dihydroxy naphthalene, diglycidyl ethers of 9,9'-bis(4-hydroxyphenyl)fluorene, triglycidyl ethers of tris(p-hydroxyphenyl)methane, tetraglycidyl ethers of tetrakis(p-hydroxyphenyl)ethane, diglycidyl ethers having an oxazolidone skeleton obtained by reacting a diglycidyl ether of bisphenol A and a bifunctional isocyanate and the like can be cited.

As examples of aliphatic glycidyl ethers that can be used as the component [A], for example, diglycidyl ethers of ethylene glycol, diglycidyl ethers of propylene glycol, diglycidyl ethers of 1,4-butanediol, diglycidyl ethers of 1,6-hexanediol, diglycidyl ethers of neopentyl glycol, diglycidyl ethers of cyclohexane dimethanol, diglycidyl ethers of glycerol, triglycidyl ethers of glycerol, diglycidyl ethers of trimethylol ethane, triglycidyl ethers of trimethylol ethane, diglycidyl ethers of trimethylol propane, triglycidyl ethers of trimethylol propane, tetraglycidyl ethers of pentaerythritol, diglycidyl ethers of dodecahydro bisphenol A, diglycidyl ethers of dodecahydro bisphenol F and the like can be cited.

As examples of glycidyl amines that can be used as the component [A], for example, diglycidyl aniline, diglycidyl toluidine, triglycidyl aminophenol, tetraglycidyl diaminodiphenyl methane, tetraglycidyl xylylene diamine, halogen, alkyl substitutes of these, hydrogenated substances thereof and the like can be cited.

As examples of epoxy resins having an oxirane ring that can be used as the component [A], oligomers of vinyl cyclohexene dioxide, dipentene dioxide, 3,4-epoxy cyclohexane carboxylic acid 3,4-epoxy kyclohexyl methyl, adipic acid bis(3,4-epoxy cyclohexyl methyl), dicyclopentadiene dioxide, bis(2,3-epoxy cyclopentyl)ether, and 4-vinyl cyclohexene dioxide and the like can be cited.

As examples of glycidyl esters that can be used as the component [A], for example, phthalic acid diglycidyl ester, terephthalic acid diglycidyl ester, hexahydrophthalic acid diglycidyl ester, dimer acid diglycidyl ester and the like can be cited.

In particular, diglycidyl ethers of bisphenol compounds, that is, bisphenol type epoxy resin, and, particularly, bisphenol A type epoxy resins are excellent in the balance between the viscosity of the epoxy resin composition, the heat resistance and mechanical properties such as elastic modulus, of the cured product obtained and, therefore, are preferably used as the component [A].

As for the bisphenol A type epoxy resin, it is preferable that the number of repeating units be 0 to 0.2 and it is a more preferable mode that the number of repeating units be 0 to 0.1.

The number of repeating units corresponds to n in a chemical structural formula of bisphenol A type epoxy resin represented by the chemical formula:

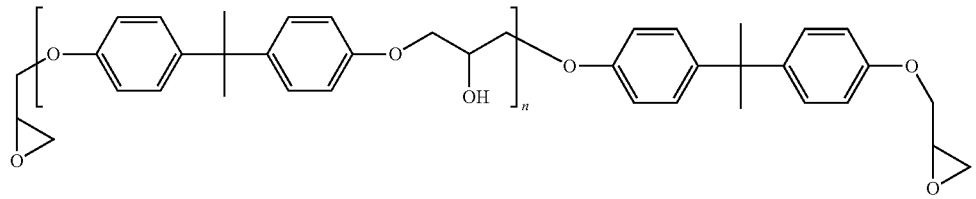

When the number of repeating units exceeds 0.2, the viscosity of the epoxy resin composition increases and the impregnating property with respect to the reinforcing fiber deteriorates and, in some cases, the heat resistance of the fiber reinforced composite material obtained is insufficient.

As for such a bisphenol A type epoxy resin, it is preferable that its epoxy equivalent be 170 to 220 and it is a more preferred mode that the epoxy equivalent be 170 to 195. The epoxy equivalent is normally in a relation in which the epoxy equivalent becomes greater as the number of repeating units is greater, and becomes smaller as the number of repeating units is smaller. When the epoxy equivalent is less than 170, a low-molecular-weight impurity is sometimes contained, leading, in some cases, to deterioration of the surface quality due to volatilization at the time of molding. Furthermore, when the epoxy equivalent exceeds 220, the viscosity of the epoxy resin composition increases and the impregnating property with respect to the reinforcing fiber deteriorates and, in some cases, the rigidity of the fiber reinforced composite material obtained is insufficient.

Component [B]: Acid Anhydride

The component [B] is an acid anhydride and, concretely, a carboxylic acid anhydride and, more concretely, refers to a compound having in a molecule one or more acid anhydride groups capable of reacting with an epoxy group of the component [A] (epoxy resin), and acts as a curing agent for the epoxy resin. It is a desirable mode that there be four acid anhydride groups or less in one molecule.

The component [B] may be an acid anhydride that, like phthalic acid anhydride, has an aromatic ring but does not have an alicyclic structure and may also be an acid anhydride that, like succinic acid anhydride, does not have either an aromatic ring or an alicyclic structure. However, it is preferable that an acid anhydride that is in a liquid state with low viscosity and that, from the viewpoint of the heat resistance and the mechanical physical property of the cured product, has an alicyclic structure be used. In particular, a compound having a cycloalkane ring or a cycloalkene ring is preferably used.

As concrete examples of an acid anhydride having an alicyclic structure as described above, for example, hexahydro phthalic acid anhydride, methyl hexahydro phthalic acid anhydride, methyl-dihydro-nadic acid anhydride, 1,2,4,5-cyclopentane tetracarboxylic acid dianhydride, 1,2,3,6-tetrahydro phthalic acid anhydride, methyl-1,2,3,6-tetrahydro phthalic acid anhydride, nadic acid anhydride, methyl-nadic acid anhydride, bicyclo[2,2,2]oct-7-ene-2,3,5, 6-tetracarboxylic acid dianhydride, 4-(2,5-dioxo tetrahydrofuran-3-yl)-3-methyl-1,2,5,6-tetrahydro phthalic acid anhydride and the like, can be cited. In particular, an acid anhydride selected from hexahydro phthalic acid anhydride, tetrahydro phthalic acid anhydride, nadic acid anhydride, and alkyl substituted types thereof are excellent in the balance between the viscosity of the epoxy resin composition and the heat resistance and mechanical properties, such as elastic modulus, of the cured product obtained, and therefore are preferably used as the component [B]. Even when an acid anhydride having an alicyclic structure is used as the component [B], the two-component type epoxy resin composition can contain an acid anhydride that does not have an alicyclic structure.

The blended amounts of the component [A] and the component [B] are preferred to be such blended amounts that a ratio between the number of acid anhydride groups (H) in the component [B] and the total number of epoxy groups (E) in the component [A], that is, the H/E ratio, is 0.8 to 1.1, and more preferred to be such blended amounts that the H/E ratio is 0.85 to 1.05, and it is a more preferred mode that the amounts be such blended amounts that the H/E ratio is 0.9 to 1.0. When the H/E ratio is less than 0.8, polymerization between epoxy resins present in excess, bringing about decreased physical properties of the cured product. Furthermore, when the H/E ratio exceeds 1.1, the curing agent component existing in excess reduces the concentration of reactive sites in the system and lowers the reaction rate so that, in some cases, sufficiently rapid curability cannot be realized.

Furthermore, the two-component type epoxy resin composition for a fiber reinforced composite material of Example 2 is a two-component type epoxy resin composition for a fiber reinforced composite material containing the component [A] and the component [B] and that has a temperature T1 at which the viscosity occurring after 5 minutes following mixture of all components is greater than or equal to 1.5 times and less than or equal to 4.0 times the viscosity occurring after 1 minute following the mixture and the viscosity occurring after 20 minutes following the mixture is greater than or equal to 1.0 time and less than or equal to 2.0 times the viscosity occurring after 5 minutes following the mixture, and wherein the temperature T1 is greater than or equal to 30° C. and less than or equal to 60° C. As for the two-component type epoxy resin composition for a fiber reinforced composite material of Example 2, it is a more preferred mode that the viscosity occurring after 5 minutes following the mixture of all components be greater than or equal to 1.7 times and less than or equal to 4.0 times the viscosity occurring after 1 minute following the mixture. Furthermore, as for the two-component type epoxy resin composition for a fiber reinforced composite material of Example 2, it is a more preferred mode that the viscosity occurring after 20 minutes following the mixture be greater than or equal to 1.0 time and less than or equal to 1.6 times the viscosity occurring after 5 minutes following the mixture.

To determine whether or not the two-component type epoxy resin composition has the temperature T1 at which the viscosity occurring after 5 minutes following the mixture of all components is greater than or equal to 1.5 times and less than or equal to 4.0 times the viscosity occurring after 1 minute following the mixture and at which the viscosity occurring after 20 minutes following the mixture is greater than or equal to 1.0 time and less than or equal to 2.0 times the viscosity occurring after 5 minutes following the mixture, viscosity measurement is performed at three points of 30° C., 40° C., and 60° C. When the foregoing viscosity condition is satisfied at any one of the temperatures, it is determined that the two-component type epoxy resin composition has the temperature T1. When the foregoing viscosity condition is not satisfied at any one of the temperatures, it is determined that the two-component type epoxy resin composition does not have the temperature T1. That is, the temperature T1 is a numerical value selected from any one of 30° C., 40° C., and 60° C.

The two-component type epoxy resin composition for a fiber reinforced composite material of Example 2, because of exhibiting the foregoing viscosity behavior, allows the resin flow following the impregnation of the reinforcing fiber to be controlled. For example, in the RTM process, resin less easily enters small gaps around parts of a mold die so that burrs the molded product decrease. For example, in the filament winding process, the drooling of the resin after resin impregnation of the reinforcing fiber can be inhibited so that it becomes possible to reduce the loss of the resin material and the molding quality improves.

Although the method for causing the two-component type epoxy resin composition for a fiber reinforced composite material to have the temperature T1 at which the viscosity occurring after 5 minutes following mixture of all components is greater than or equal to 1.5 times and less than or equal to 4.0 times the viscosity occurring after 1 minute following the mixture and the viscosity occurring after 20 minutes following the mixture is greater than or equal to 1.0 time and less than or equal to 2.0 times the viscosity occurring after 5 minutes following the mixture and for causing the temperature T1 to be greater than or equal to 30° C. and less than or equal to 60° C. is not particularly limited, for example, a method in which a component [C] described below is included in the two-component type epoxy resin composition for a fiber reinforced composite material can be cited. That is, it is preferable that the two-component type epoxy resin composition for a fiber reinforced composite material of Example 2 include the component [C].

Component [C]: Quaternary Ammonium Salt, Quaternary Phosphonium Halide, or Imidazolium Salt The component [C] preferably used in Examples 1 and 2 is a quaternary ammonium salt, a quaternary phosphonium halide, or an imidazolium salt. These can act as a cure accelerating agent for developing fast curability.

We found that when a quaternary ammonium salt, a quaternary phosphonium halide, or an imidazolium salt is applied to the invention, the viscosity after a base compound liquid and a curing agent liquid described below are mixed increases only by a small amount and is stable, and the resin is excellent in the impregnating property with respect to a reinforcing fiber substrate when a fiber reinforced composite material is molded and, on another hand, the reaction rate during an intermediate-to-late period of a curing reaction is sufficiently high and the curing time can be shortened, and, furthermore, a colorless transparent cured product is obtained (*) although the detailed mechanisms are not certainly known.

The (i) quaternary ammonium salt, the (ii) quaternary phosphonium halide, and the (iii) imidazolium salt for use as the component [C] will each be described in more detail below.

(i) Quaternary Ammonium Salt

A quaternary ammonium salt, in addition to the foregoing features (*), has a tendency that although the viscosity increase at normal temperature after the base compound liquid and the curing agent liquid are mixed, in particular, is small, the curing time is to be short, and therefore is excellent in the impregnating property with respect to a reinforcing fiber substrate when a fiber reinforced composite material is formed, and makes it possible to form a fiber reinforced composite material at high productivity, and therefore is preferable.

As concrete examples of the quaternary ammonium salt for use as the component [C], for example, quaternary ammonium oxo acid salts made of a quaternary ammonium cation and an oxo acid anion, quaternary ammonium halides made of a quaternary ammonium cation and an anion of a seventeenth group element, quaternary ammonium borate salts made of a quaternary ammonium cation and a borate anion that includes a boron and the like can be cited.

As examples of the quaternary ammonium oxo acid salt, for example, tetramethyl ammonium perchlorate, tetramethyl ammonium sulfate, tetramethyl ammonium acetate, tetramethyl ammonium hydrogen sulfate, tetraethyl ammonium nitrate, tetraethyl ammonium perchlorate, cetyl trimethyl ammonium perchlorate, hexadecyl trimethyl ammonium perchlorate, tetrabutyl ammonium perchlorate, tri-n-octyl methyl ammonium hydrogen sulfate, tetrabutyl ammonium acetate, tetrabutyl ammonium hydrogen sulfate, tetramethyl ammonium p-toluene sulfonate, tetraethyl ammonium p-toluene sulfonate, tetrabutyl ammonium salicylate and the like can be cited.

As examples of the quaternary ammonium halide, for example, tetramethyl ammonium chloride, methyl triethyl ammonium chloride, tetraethyl ammonium chloride, tributyl methyl ammonium chloride, decyl trimethyl ammonium chloride, trimethyl-n-octyl ammonium chloride, lauryl trimethyl ammonium chloride, dodecyl trimethyl ammonium chloride, trimethyl dodecyl ammonium chloride, trimethyl myristyl ammonium chloride, tetradecyl trimethyl ammonium chloride, trimethyl tetradecyl ammonium chloride, tetrapropyl ammonium chloride, cetyl trimethyl ammonium chloride, hexadecyl trimethyl ammonium chloride, trimethyl octadecyl ammonium chloride, tri-n-octyl methyl ammonium chloride, dilauryl dimethyl ammonium chloride, tetrabutyl ammonium chloride, dimethyl dioctadecyl ammonium chloride, dimethyl distearyl ammonium chloride, tetrapentyl ammonium chloride, tetraamyl ammonium chloride, phenyl trimethyl ammonium chloride, benzyl trimethyl ammonium chloride, 1,1-dimethyl piperidinium chloride, phenyl benzyl dimethyl ammonium chloride, phenyl triethyl ammonium chloride, benzyl triethyl ammonium chloride, benzyl tributyl ammonium chloride, tetramethyl ammonium bromide, trimethyl propyl ammonium bromide, tetraethyl ammonium bromide, hexyl trimethyl ammonium bromide, decyl trimethyl ammonium bromide, trimethyl-n-octyl ammonium bromide, nonyl trimethyl ammonium bromide, lauryl trimethyl ammonium bromide, tetrapropyl ammonium bromide, myristyl trimethyl ammonium bromide, didecyl dimethyl ammonium bromide, dimethyl dioctyl ammonium bromide, cetyl trimethyl ammonium bromide, hexyl dimethyl octyl ammonium bromide, trimethyl heptadecyl ammonium bromide, trimethyl octadecyl ammonium bromide, trimethyl stearyl ammonium bromide, didodecyl dimethyl ammonium bromide, dimethyl ditetradodecyl ammonium bromide, tetrabutyl ammonium bromide, cetyl ethyl dimethyl ammonium bromide, ethyl hexadecyl dimethyl ammonium bromide, dimethyl distearyl ammonium bromide, dihexadecyl dimethyl ammonium bromide, tetrapentyl ammonium bromide, tetrahexyl ammonium bromide, tetraheptyl ammonium bromide, tetra(decyl)ammonium bromide, tetra-n-octyl ammonium bromide, phenyl trimethyl ammonium bromide, 1-butyl-1-methyl pyrrolidinium bromide, benzyl trimethyl ammonium bromide, 1-butyl-1-methyl piperidinium bromide, 1-methyl-1-propyl piperidinium bromide, benzyl triethyl ammonium bromide, benzyl dodecyl dimethyl ammonium bromide, tributyl benzyl ammonium bromide, tetramethyl ammonium iodide, ethyl trimethyl ammonium iodide, tetraethyl ammonium iodide, ethyl tripropyl ammonium iodide, tetrapropyl ammonium iodide, tetrabutyl ammonium iodide, dimethyl distearyl ammonium iodide, tetrahexyl ammonium iodide, tetrapentyl ammonium iodide, tetraheptyl ammonium iodide, tetra-n-octyl ammonium iodide, trimethylphenyl ammonium iodide, triethylphenyl ammonium iodide, benzyl triethyl ammonium iodide and the like can be cited.

As examples of the quaternary ammonium borate salt, for example, tetramethyl ammonium tetrafluoroborate, triethyl methyl ammonium tetrafluoroborate, tetraethyl ammonium tetrafluoroborate, cetyl trimethyl ammonium tetrafluoroborate, hexadecyl trimethyl ammonium tetrafluoroborate, tetrabutyl ammonium tetrafluoroborate, 1-ethyl-1-methyl pyrrolidinium tetrafluoroborate, tetrabutyl ammonium tetraphenyl borate and the like can be cited.

Among the foregoing, a quaternary ammonium halide is preferably used and quaternary ammonium bromide is more preferably used from the viewpoint of solubility in the epoxy resin and the curing agent and costs.

(ii) Quaternary Phosphonium Halide

In addition to the foregoing features (*), the quaternary phosphonium halide often exhibits a viscosity behavior that, at a level that does not impair the impregnating property, at a temperature greater than or equal to 30° C. and less than or equal to 60° C., the viscosity occurring after 5 minutes following the mixture of all components is greater than or equal to 1.5 times and less than or equal to 4.0 times the viscosity occurring after 1 minute following the mixture and the viscosity occurring after 20 minutes following the mixture is greater than or equal to 1.0 time and less than or equal to 2.0 time the viscosity occurring after 5 minutes following the mixture, and can often control flow or the resin, so that the quaternary phosphonium halide is preferably used as the component [C]. The shapes of formed products have become complicated and, to cope with that, mold dies have become complicated; for instance, a mold die is dividable into a plurality of parts. There is possibility that after impregnating a reinforcing fiber substrate at the time of molding a fiber reinforced composite material, resin may enter small void spaces between parts of a mold die and result increased burrs of the molding. However, since, after the impregnation, the resin viscosity appropriately increases, resin flow is controlled. For example, in the RTM process, it becomes less likely that resin enters small void spaces between parts of a mold die, so that burrs on moldings can be made less. In the filament winding process, the drooling of resin can be reduced. Thus, use of the quaternary phosphonium halide is preferable.

As concrete examples of quaternary phosphonium halides for use as the component [C], tetraethylphosphonium bromide, tributyl methylphosphonium iodide, tributyl (cyano methyl)phosphonium chloride, tetrakis(hydroxymethyl) phosphonium chloride, tetrabutylphosphonium bromide, tetrabutylphosphonium chloride, tributyl-n-octylphosphonium bromide, tetra-n-octylphosphonium bromide, tributyl dodecylphosphonium bromide, tributyl hexadecylphosphonium bromide, methyl triphenylphosphonium iodide, methyl triphenylphosphonium bromide, methyl triphenylphosphonium chloride, tetraphenylphosphonium bromide, tetraphenylphosphonium chloride, tetraphenylphosphonium iodide, ethyl triphenylphosphonium bromide, ethyl triphenylphosphonium iodide, isopropyl triphenylphosphonium iodide, butyl triphenylphosphonium bromide, triphenyl propylphosphonium bromide, amyl triphenylphosphonium bromide, benzyl triphenylphosphonium chloride, benzyl triphenylphosphonium bromide, hexyl triphenylphosphonium bromide, heptyl triphenylphosphonium bromide, triphenyl (tetradecyl)phosphonium bromide, (1-naphthyl methyl) triphenylphosphonium chloride and the like can be cited.

As the quaternary phosphonium halide for use as the component [C], a quaternary phosphonium bromide is a preferred mode from the viewpoint of the solubility in the component [A] and the component [B] and costs and also from the foregoing specific viscosity behavior development. As concrete examples thereof, tetraethylphosphonium bromide, tetrabutylphosphonium bromide, tributyl-n-octylphosphonium bromide, tetra-n-octylphosphonium bromide, tributyldodecylphosphonium bromide, tributylhexadecylphosphonium bromide, methyltriphenylphosphonium bromide, tetraphenylphosphonium bromide, ethyltriphenylphosphonium bromide, butyltriphenylphosphonium bromide, triphenylpropylphosphonium bromide, amyltriphenylphosphonium bromide, benzyltriphenylphosphonium bromide, hexyltriphenylphosphonium bromide, heptyltriphenylphosphonium bromide, triphenyl(tetradecyl)phosphonium bromide and the like can be cited.

As the quaternary phosphonium halide for use as the component [C], a tetraphenylphosphonium halide is a preferred mode from the viewpoint of physical properties of the cured product. As concrete examples thereof, tetraphenylphosphonium bromide, tetraphenylphosphonium chloride, and tetraphenylphosphonium iodide can be cited.

(iii) Imidazolium Salt

In addition to the foregoing features (*), an imidazolium salt has a tendency that although the viscosity increase at normal temperature after the base compound liquid and the curing agent liquid are mixed, in particular, is small, the curing time is to be short, and therefore is excellent in the impregnating property with respect to a reinforcing fiber substrate when a fiber reinforced composite material is formed, and makes it possible to form a fiber reinforced composite material at high productivity and, therefore, is preferable.

It is preferable that the content of the component [C] preferably used in Examples 1 and 2 be 6 to 25 mass parts relative to 100 mass parts of the component [A], and it is a preferred mode that the content thereof be 6 to 20 mass parts. When the component [C] is less than 6 mass parts, the time needed for curing is longer and, in some cases, sufficiently rapid curability cannot be achieved. On the other hand, when the component [C] is more than 25 mass parts, the time for which low viscosity is maintained becomes shorter and, in some cases, impregnation of the reinforcing fiber is difficult. Because the use of component [B] and the component [C] in appropriate blended amounts can easily realize favorable achievement of curing speed improvement and viscosity stability at low temperature, the use of the component [C] is preferable.

As concrete examples of the imidazolium salt for use as the component [C], for example, 1-butyl-3-methylimidazolium bromide, 1-butyl-3-methylimidazolium chloride, 1-butyl-3-methylimidazolium tetrafluoroborate, 1-butyl-3-methylimidazolium hexafluorophosphate, 1-butyl-3-methylimidazolium trifluoromethane sulfonate, 1-butyl-2,3-dimethylimidazolium chloride, 1-butyl-2,3-dimethyl imidazolium hexafluorophosphate, 1-butyl-2,3-dimethylimidazolium tetrafluoroborate, 1-butyl-3-methylimidazolium bis(trifluoromethanesulfonyl)imide, 1-butyl-3-methylimidazolium tetrachloroferrate, 1-butyl-3-methyl imidazolium iodide, 1-butyl-2,3-dimethylimidazolium bis(trifluoromethanesulfonyl)imide, 1-butyl-3-methylimidazolium trifluoro(trifluoromethyl)borate, 1-butyl-3-methylimidazolium tribromide, 1-butyl-3-methylimidazolium thiocyanate, 1-butyl-2,3-dimethyl imidazolium trifluoromethane sulfonate, 1,3-dimethylimidazolium dimethyl phosphate, 1,3-dimethylimidazolium chloride, 1,3-dimesitylimidazolium chloride, 1,3-bis(2,6-diisopropyl phenyl) imidazolium chloride, 1,3-di(1-adamantyl)imidazolium tetrafluoroborate, 1,3-diisopropylimidazolium tetrafluoroborate, 1,3-di-tert-butylimidazolium tetrafluoroborate, 1,3-dicyclohexylimidazolium tetrafluoroborate, 1,3-dicyclohexylimidazolium chloride, 1,2-dimethyl-3-propylimidazolium iodide, 2,3-dimethyl-1-propylimidazolium bis(trifluoromethanesulfonyl)imide, 1-decyl-3-methylimidazolium bis(trifluoromethanesulfonyl)imide, 1,3-dimethylimidazolium iodide, 1-ethyl-3-methylimidazolium chloride, 1-ethyl-3-methylimidazolium hexafluorophosphate, 1-ethyl-3-methylimidazolium trifluoromethane sulfonate, 1-ethyl-3-methylimidazolium tetrafluoroborate, 1-ethyl-3-methylimidazolium bromide, 1-ethyl-3-methylimidazolium iodide, 1-ethyl-3-methyl imidazolium bis(trifluoromethanesulfonyl)imide, 1-ethyl-3-methylimidazolium ethyl sulfate, 1-ethyl-3-methylimidazolium p-toluene sulfonate, 1-ethyl-3-methylimidazolium dicyanamide, 1-ethyl-3-methylimidazolium tetrachloroferrate, 1-ethyl-2,3-dimethylimidazolium bis(trifluoromethanesulfonyl)imide, 1-ethyl-3-methylimidazolium hydrogen sulfate salt, 1-ethyl-3-methylimidazolium methane sulfonate, 1-ethyl-3-methylimidazolium trifluoro(trifluoromethyl)borate, 1-ethyl-3-methyl imidazolium acetate, 1-hexyl-3-methylimidazolium chloride, 1-hexyl-3-methylimidazolium hexafluorophosphate, 1-hexyl-3-methylimidazolium tetrafluoroborate, 1-hexyl-3-methyl imidazolium trifluoromethane sulfonate, 1-hexyl-3-methylimidazolium bromide, 1-hexyl-2,3-dimethylimidazolium iodide, 1-hexyl-3-methylimidazolium bis(trifluoromethanesulfonyl)imide, 1-(2-hydroxyethyl)-3-methylimidazolium tetrafluoroborate, 1-methyl-3-propylimidazolium iodide, 1-methyl-3-n-octylimidazolium bromide, 1-methyl-3-n-octylimidazolium chloride, 1-methyl-3-n-octylimidazolium hexafluorophosphate, 1-methyl-3-[6-(methylsulfinyl)hexyl]imidazolium p-toluene sulfonate, 1-methyl-3-[6-(methylthio)hexyl]imidazolium p-toluene sulfonate, 1-methyl-3-n-octylimidazolium trifluoromethane sulfonate, 1-methyl-3-n-octylimidazolium tetrafluoroborate and the like can be cited. Among these, imidazolium halides are preferably used from the viewpoint of solubility in the epoxy resin and the curing agent and costs.

Viscosity of Two-Component Type Epoxy Resin Composition

As for the two-component type epoxy resin composition, it is preferable that the foregoing components be properly blended so that, at 40° C., the viscosity occurring after 1 minute following the mixture of all components be 0.1 to 2.0 Pa·s, and it is a more preferred mode that the viscosity be 0.1 to 1.5 Pa·s. It is because, by making the viscosity less than or equal to 2.0 Pa·s, the viscosity at a molding temperature can be made low so that when, at the time of forming a fiber reinforced composite material, the time of injection into a reinforcing fiber substrate becomes short and, therefore, causes for a impregnated state can be reduced. Furthermore, it is because, due to making the viscosity greater than or equal to 0.1 Pa·s, the viscosity at a molding temperature does not become excessively low and, at the time of forming a fiber reinforced composite material, pits formed as air is taken in when the resin is injected into the reinforcing fiber substrate can be prevented. Therefore, occurrence of unimpregnated regions resulting from non-uniform impregnation can be prevented.

The viscosity can be determined by measuring the viscosity immediately after the mixing preparation of the two-component type epoxy resin composition on the basis of a measurement method that uses a cone-plate type rotational viscometer in ISO 2884-1 (1999). As a measurement apparatus, for example, a TVE-33H type made by Toki Sangyo Co., Ltd. and the like can be cited. The viscosity immediately after the mixing preparation is the viscosity occurring after 1 minute following the mixing preparation.

Cure Index of Two-Component Type Epoxy Resin Composition

It is preferable that the two-component type epoxy resin composition have a specific temperature T2 at which t10 and t90 satisfy the three relational expressions Expression (1) to Expression (3) where t10 and t90 are times at which the cure indexes determined by dielectric measurement when a fixed temperature is maintained are 10% and 90%, respectively.

$$0.5 \leq t10 \leq 2 \qquad (1)$$

$$0.5 \leq t90 \leq 5 \qquad (2)$$

$$1 < t90/t10 \leq 2.5 \qquad (3)$$

where t10 represents the time (minute) from the start of the measurement until the cure index reaches 10% at the temperature T2 and t90 represents the time (minute) from the start of the measurement until the cure index reaches 90% at the temperature T2.

The dielectric measurement, despite not providing a univocal correspondence between viscosity and elastic modulus, is useful in determining the cure profile of a thermosetting resin that changes from a low viscosity liquid to a high elastic modulus amorphous solid. In the dielectric measurement, the cure profile is determined from a time-dependent change in the ion viscosity (equivalent resistivity) that is determined from a complex permittivity measured by applying a high-frequency electric field to the thermosetting resin.

As a dielectric measurement apparatus, for example, a MDE-10 cure monitor made by Holometrix-Micromet company can be used. As for the measurement method, first, an O-ring made of Viton of 32 mm in inside diameter and 3 mm in thickness is set on a lower surface of a Programmable Minipress MP2000 with a TMS-1 inch type sensor embedded in the lower surface, and the temperature of the press is set to a predetermined temperature T. Next, an epoxy resin composition is poured into the inside of the O-ring. After the press is closed, time-dependent changes in the ion viscosity of the epoxy resin composition are tracked. The dielectric measurement is performed at frequencies of 1, 10, 100, 1000, and 10000 Hz. Using software (Eumetric) bundled with the apparatus, logarithms Log($\sigma$) of frequency-dependent ion viscosities are obtained.

The cure index at a time t required for curing is determined as follows Expression (4). The time at which the cure index reaches 10% is defined as t10 and the time at which the cure index reaches 90% is defined as t90.

$$\text{Cure index} = \{\log(\alpha t) - \log(\alpha min)\}/\{\log(\alpha max) - \log(\alpha min)\} \times 100 \qquad (4)$$

Cure index: (unit: %)
$\alpha t$: ion viscosity at time t (unit: $\Omega \cdot cm$)
$\alpha min$: minimum value of ion viscosity (unit: $\Omega \cdot cm$)
$\alpha max$: maximum value of ion viscosity (unit: $\Omega \cdot cm$)

The tracking of the ion viscosity by the dielectric measurement is relatively easy even when the curing reaction is rapid. Furthermore, the ion viscosity can be measured even after gelation, and has a characteristic of increasing with progress of curing and reaching a saturation as the curing is complete. Therefore, this can be used to track not only viscosity changes during an early period but also the progress of the curing reaction. As in the foregoing, the value obtained by standardizing logarithms of ion viscosities so that the minimum value is 0% and the saturated value (maximum value) is 100% is termed cure index, and used to describe the cure profile of a thermosetting resin. By using the time at which the cure index reaches 10% as an indicator concerning the rapidness of an early viscosity increase and using the time at which the cure index reaches 90% as an indicator concerning the curing time, preferable conditions such that the early viscosity increase is small and such that curing can be accomplished in a short time can be described.

To summarize the meaning of the foregoing three relational Expressions, t10, proportional to the time (flowable time) when the two-component type epoxy resin composition is able to flow at the specific temperature T2, is greater than or equal to 0.5 minute and less than or equal to 2 minutes Expression (1), and t90, proportional to the time (mold releasable time) when the curing of the two-component type epoxy resin composition is substantially completed and mold release is possible, is greater than or equal to 0.5 minute and less than or equal to 5 minutes Expression (2), and the ratio between the mold releasable time and the flowable time of the epoxy resin composition is greater than 1 and less than or equal to 2.5 Expression (3). Specifically, it means that within the foregoing ranges, when t10 is large, the two-component type epoxy resin composition is more likely to impregnate the reinforcing fiber substrate during the mold of a fiber reinforced composite material, and when t90 is small, the curing of the two-component type epoxy resin composition is rapid. Therefore, it is preferable that t90/t10 be smaller within the range greater than 1 and less than or equal to 2.5.

Considering the balance with the molding temperature described below, it is preferable that the molding temperature (heated cure temperature) of the epoxy resin composition, that is, the specific temperature T2, be 100 to 140° C. Setting the specific temperature T2 to 100 to 140° C. reduces the time required for curing and, at the same time, lessens the thermal shrinkage after mold release so that a fiber reinforced composite material good in surface quality can be obtained.

Blending of Two-Component Type Epoxy Resin Composition

As for the two-component type epoxy resin composition, first, the base compound liquid containing the component [A] and the curing agent liquid containing the component [B] as a main component (the main component mentioned herein means as that the main component is a component having the largest amount in the curing agent liquid on the basis of mass) are respectively blended in the foregoing blended amounts beforehand. Immediately before use, the two-component type epoxy resin composition is obtained by mixing the base compound liquid and the curing agent liquid so that the aforementioned blended amounts are obtained. Although the foregoing component [C] can be blended in either the base compound liquid or the curing agent liquid, it is a more preferred mode that the component [C] be contained in the curing agent liquid.

Other blending components may be blended in either the base compound liquid or the curing agent liquid, and can be blended in either one or both of them beforehand and then used. It is preferable that the base compound liquid and the curing agent liquid be warmed separately before being mixed. It is preferable to obtain a two-component type epoxy resin composition by mixing the base compound liquid and the curing agent liquid immediately before use, such as pour into a molding die, from standpoint of the usable time of resin.

Component [D]: Reinforcing Fiber

The two-component type epoxy resin composition may contain a reinforcing fiber as a component [D] according to need. As the reinforcing fiber in such a case, glass fiber, aramid fiber, carbon fiber, boron fiber, or the like is suitably used. In particular, carbon fiber is suitably used for the reason that a fiber reinforced composite material that is excellent in mechanical properties, such as strength and elastic modulus, despite being light in weight.

The reinforcing fiber may be either a short fiber or a continuous fiber, and both of them may be used together. To obtain a high-Vf fiber reinforced composite material, a continuous fiber is used.

When a continuous fiber is used as the reinforcing fiber, the reinforcing fiber is sometimes used in the configuration of strand but it is preferable to use the reinforcing fiber as a reinforcing fiber substrate processed as a mat, a woven fabric, a knit, a blade, a unidirectional sheet and the like. In particular, a woven fabric is suitably used because the woven fabric make it relatively easy to increase the fiber volume fraction Vf (detailed later) of the fiber reinforced composite material and is excellent in handling property. In that case, the higher the filling factor of the woven fabric, the easier it is to obtain a fiber reinforced composite material having a high fiber volume fraction Vf. Therefore, it is preferable that the filling factor of the woven fabric be, preferably, 0.10 to 0.85, more preferably, 0.40 to 0.85, and, even more preferably, 0.50 to 0.85.

The filling factor of the woven fabric is the ratio of a net volume of the reinforcing fiber to an apparent volume of the woven fabric and can be determined using an expression of $W/(1000 t \cdot \rho f)$.

W: basis weight (unit: $g/m^2$)
t: thickness (unit: mm)
$\rho f$: density of reinforcing fiber (unit: $g/cm^3$)

The basis weight and thickness of the woven fabric used here are determined in conformity with JIS R 7602(1995).

Fiber Reinforced Composite Material

By combining the two-component type epoxy resin composition and the reinforcing fiber, which is the component [D], and subsequently curing the two-component type epoxy resin composition, the fiber reinforced composite material is obtained. As a forming method for the fiber reinforced composite material, forming methods that use a two-component type resin such as a hand layup process, a filament winding process, a pultrusion process, and an RTM (resin transfer molding), are suitably used. Among these, the RTM molding method is particularly suitably used from the viewpoint of productivity and the degree of freedom in shape of the formed product. The RTM molding method is a method of obtaining a reinforcing fiber composite material by injecting resin into a reinforcing fiber substrate disposed in a molding die and curing the resin.

Next, using the RTM molding method as an example, a method of producing the fiber reinforced composite material will be described. First, a two-component type epoxy resin composition is obtained as described above. It is preferable that the fiber reinforced composite material be produced by injecting a heated two-component type epoxy resin composition described above into a reinforcing fiber substrate disposed in a molding die heated to the specific temperature T so that the composite impregnates the substrate and cures within the molding die.

The temperature to which the two-component type epoxy resin composition is heated is determined from a relation between the initial viscosity and viscosity increase of the two-component type epoxy resin composition and is preferably 30 to 70° C. and more preferably 50 to 60° C., from the standpoint of the impregnating property with respect to the reinforcing fiber substrate.

Furthermore, in the production method for the fiber reinforced composite material, it is a preferred mode to select appropriate conditions according to the fiber reinforced composite material to obtain, such as using a molding die having a plurality of inlets, injecting the two-component type epoxy resin composition through the plurality of inlets simultaneously or sequentially at different times, because this provides degrees of freedom such that moldings of various shapes and sizes can be coped with. Although the number and shape of the inlets are not restricted, the more the inlets, the better it is because injection in short time is enabled. Furthermore, as for the arrangement of the inlets, positions thereof that allow the flow length of resin to be shortened according to the shape of the fiber reinforced composite material to be molded are preferable.

The injection pressure for the two-component type epoxy resin composition is usually 0.1 to 1.0 MPa but is preferred to be 0.1 to 0.6 MPa from the standpoint of injection time and economy of equipment, although a VaRTM (vacuum assist resin transfer molding) method of injecting an epoxy resin composition while vacuuming the inside of the mold can be used. Furthermore, even when pressurized injection is performed, occurrence of voids can be inhibited if the inside of the mold is depressurized before the two-component type epoxy resin composition is injected.

In the fiber reinforced composite material, the reinforcing fiber used is as described in "Component [D]: Reinforcing Fiber."

Fiber Volume Fraction in Fiber Reinforced Composite Material

For the fiber reinforced composite material to have a high specific strength or specific elastic modulus, the fiber volume fraction Vf thereof is preferably 40 to 85% and more preferably 45 to 85%. The fiber volume fraction Vf of the fiber reinforced composite material mentioned here is a value defined as below and measured in conformity with ASTM D3171 (1999) and refers to a value in a state after the epoxy resin composition is injected into the reinforcing fiber substrate and is cured. That is, measurement of the fiber volume fraction Vf of the fiber reinforced composite material can be represented through the use of Expression (5) with the thickness h of the fiber reinforced composite material.

$$\text{Fiber volume fraction Vf (\%)} = (Af \times N)/(\rho f \times h)/10 \tag{5}$$

Af: mass of fiber substrate per sheet of 1 $m^2$ ($g/m^2$)
N: number of stacked sheets of fiber substrate (sheets)
$\rho f$: density of reinforcing fiber ($g/cm^3$)
h: thickness of fiber reinforced composite material (test piece) (mm)

When the mass of the fiber substrate per sheet of 1 $m^2$ Af, the number of stacked sheets N of the fiber substrate and the density $\rho f$ of the reinforcing fiber are not known, the fiber volume fraction in the fiber reinforced composite material can be measured by one of the sulfuric acid decomposition process, nitric acid decomposition process, and the combustion method based on JIS K 7075 (1991). As the density of the reinforcing fiber used in this case, a value measured on the basis of JIS R 7603 (1999) is used.

A concrete measurement method for the thickness h of the fiber reinforced composite material is a method capable of correctly measuring the thickness of the fiber reinforced composite material, and measurement is performed by using a micrometer prescribed in JIS B 7502 (1994) or a one that is at least comparable to that in accuracy as mentioned in JIS K 7072 (1991). When a fiber reinforced composite material is in a complicated shape so that measurement cannot be carried out, samples (samples having certain shape and size for measurement) are cut out from the fiber reinforced composite material to perform measurement.

As a preferred form of the fiber reinforced composite material, a single plate can be cited. Furthermore, as other preferred forms, a sandwich structural body in which a single-platy fiber reinforced composite material is disposed on both surfaces of a core material, a hollow structural body whose perimeter is covered with a single-platy structural body, a so-called canape structural body in which a single-platy fiber reinforced composite material is disposed on a one-side surface of a core material, etc. can be cited.

As core materials of the sandwich structural body and the canape structural body, honeycomb cores made of aluminum or aramid, foam cores of polyurethane, polystyrene, polyamide, polyimide, polyvinyl chloride, phenol resin, acrylic resin, epoxy resin and the like, woods such as balsa and the like, can be cited. In particular, a foam core is suitably used as the core material for the reason that a light-weight fiber reinforced composite material can be obtained.

The fiber reinforced composite material is excellent in mechanical characteristics, such as strength and elastic modulus, despite being light in weight. Therefore, the fiber reinforced composite material can be preferably used for structure members, outer plates and the like, of aircrafts, space satellites, industrial machines, railway vehicles, ships and boats, motor vehicles and the like. Furthermore, the fiber reinforced composite material is excellent in color tone and surface quality. Therefore, the fiber reinforced composite material can be preferably employed for use as motor vehicle outer plates.

EXAMPLES

Next, using examples, the two-component type epoxy resin composition for a fiber reinforced composite material and the fiber reinforced composite material will be described further in detail.

Resin Raw Materials

To obtain two-component type epoxy resin composition of examples, the following resin raw materials were used. The units of content rates in epoxy resin compositions in Tables 1 and 2 mean "mass parts" unless otherwise mentioned.

1. Epoxy Resin

"jER" (registered trademark) 1001 (made by Mitsubishi Chemical Corporation): bisphenol A type epoxy resin, epoxy equivalent of 475

"Epotohto" (registered trademark) YD-128 (made by NIPPON STEEL & SUMIKIN CHEMICAL CO., LTD.): bisphenol A type epoxy resin, epoxy equivalent of 189

"Epotohto" (registered trademark) YDF-170 (made by NIPPON STEEL & SUMIKIN CHEMICAL CO., LTD.): bisphenol F type epoxy resin, epoxy equivalent of 170

"CELLOXIDE" (registered trademark) 2021P (made by DAICEL CORPORATION): alicyclic epoxy resin, epoxy equivalent of 137

2. Acid Anhydride

HN-5500 (made by Hitachi Chemical Co., Ltd.): methyl hexahydro phthalic acid anhydride "KAYAHARD" (registered trademark) MCD (made by Nippon Kayaku Co., Ltd.): methyl-nadic acid anhydride 3. Quaternary Ammonium Salt tetramethyl ammonium bromide (made by Tokyo Chemical Industry Co., Ltd.)

tetramethyl ammonium chloride (made by Tokyo Chemical Industry Co., Ltd.)

trimethylphenyl ammonium bromide (made by Tokyo Chemical Industry Co., Ltd.)

4. Quaternary Phosphonium Halide tetraphenylphosphonium bromide (made by Tokyo Chemical Industry Co., Ltd.)

ethyl triphenylphosphonium bromide (made by Tokyo Chemical Industry Co., Ltd.)

tetraphenylphosphonium chloride (made by Tokyo Chemical Industry Co., Ltd.)

5. Imidazolium Salt 1-butyl-3-methylimidazolium chloride (made by Tokyo Chemical Industry Co., Ltd.)

1-butyl-3-methylimidazolium bromide (made by Tokyo Chemical Industry Co., Ltd.)

1-ethyl-3-methylimidazolium bromide (made by Tokyo Chemical Industry Co., Ltd.)

6. Other Substances triethylene diamine (made by Tokyo Chemical Industry Co., Ltd.)

metaxylene diamine (made by Tokyo Chemical Industry Co., Ltd.)

tetraphenylphosphonium tetra-p-tolyl borate (made by HOKKO CHEMICAL INDUSTRY CO., LTD.)

tetrabutylphosphonium decanoate (made by HOKKO CHEMICAL INDUSTRY CO., LTD.)

tri-p-tolyl phosphine (made by Tokyo Chemical Industry Co., Ltd.)

1,2-dimethyl imidazole (made by SHIKOKU CHEMICALS CORPORATION)

2-ethyl-4-methyl imidazole (made by SHIKOKU CHEMICALS CORPORATION)

Preparation of Epoxy Resin Composition

According to blending ratios mentioned in Tables 1 to 4, epoxy resin was blended to provide base compound liquids. At blending ratios mentioned in Tables 1 to 4, the component [B] (various acid anhydrides) and the component [C] (quaternary ammonium salt, quaternary phosphonium halide, imidazolium salt, other substances) were blended to provide curing agent liquids. Using these base compound liquids and curing agent liquids, the materials were mixed at blending ratios mentioned in Tables 1 to 4 to prepare epoxy resin compositions.

Measurement of Viscosity of Epoxy Resin Compositions

In conformity with the measurement method that uses a cone-plate type rotational viscometer in ISO 2884-1 (1999), the viscosity of each epoxy resin composition after mixing preparation were measured, and were used as indicators of viscosity stability. As for an device, a TVE-33H type made by Toki Sangyo Co., Ltd. was used. Here, a rotor of 1°34'×R24 was used, the measurement temperature was 40° C., and the sample amount was 1 cm$^3$.

Dielectric Measurement

Dielectric measurement was performed to track the curing of epoxy resin. As a dielectric measurement apparatus, a MDE-10 Cure Monitor made by Holometrix-Micromet company was used. An O-ring made of Viton of 32 mm in inside diameter and 3 mm in thickness was set on a lower surface of a Programmable Minipress MP2000 with a TMS-1 inch type sensor embedded in the lower surface, and the temperature of the press was set to 120° C. The epoxy resin composition was poured into the inside of the O-ring. After the press was closed, time-dependent changes in the ion viscosity of the epoxy resin composition were tracked. The dielectric measurement was performed at frequencies of 1, 10, 100, 1000, and 10000 Hz. Using the bundled software, logarithms Log($\sigma$) of frequency-dependent ion viscosities were obtained.

Next, the cure index was determined using the following Expression (4). The times t10 and t90 at which the cure index reached 10% and 90% were determined.

$$\text{Cure index} = \{\log(\alpha t) - \log(\alpha \min)\}/\{\log(\alpha \max) - \log(\alpha \min)\} \times 100 \quad (4)$$

Cure index: (unit: %)
$\alpha t$: ion viscosity at time t (unit: $\Omega \cdot cm$)
$\alpha \min$: minimum value of ion viscosity (unit: $\Omega \cdot cm$)
$\alpha \max$: maximum value of ion viscosity (unit: $\Omega \cdot cm$)

Making of Cured Resin Plate

A 2 mm thick spacer made of copper obtained by cutting out a square having sides of 50 mm was set on a lower surface of a press apparatus. After the temperature of the press was set to 120° C., the epoxy resin composition was poured to the inner side of the spacer and the press was closed. After 20 minutes, the press was open to obtain a cured resin plate.

Measurement of Glass Transition Temperature Tg of Cured Products

Test pieces of 12.7 mm in width and 40 mm in length were cut out of a cured resin plate and torsion DMA measurement was performed by using a rheometer (ARES made by TA Instruments). A measurement condition was a temperature increase speed of 5° C./min. The temperature at an inflection point of a storage elastic modulus G' obtained by the measurement was defined as Tg.

Coloration of Cured Products

With regard to the foregoing cured resin plate, the presence or absence of coloration was determined. Concretely, using a 30 mm-square and 2 mm-thick test piece cut out from a cured resin plate and employing a spectrophotometer (CM-700d made by Konica Minolta, Inc.), the color tone of the cured product was represented in the L*a*b color system. The L*a*b color system is a system used to represent the colors of substances in which L* represents lightness and a* and b* represent chromaticity. Here, a* indicates the red direction, -a* the green direction, b* the yellow direction, and -b* the blue direction. As for measurement conditions, spectral transmittance was measured in the wavelength range of 380 to 780 nm in the conditions of a D65 light source and a field of view of 10° without inclusion of regular reflected light. At this time, results with $|a^*| \leq 2$ and $|b^*| \leq 5$ were determined as being "without coloration" and the other results were determined as being "with coloration".

Manufacture of Fiber Reinforced Composite Material

As fiber reinforced composite materials for mechanical tests, fiber reinforced composite materials manufactured by the RTM molding method mentioned below were used.

In a mold die having a planar mold cavity of 350 mm×700 mm×2 mm, 9 sheets of carbon fiber woven fabric CO6343 (carbon fiber: T300-3K, texture: plain weave, basis weight: 198 g/m$^2$, made by Toray Industries, Inc.) were stacked within the mold cavity, and mold clamping was carried out by a press apparatus. Next, the inside of the mold die kept a temperature (molding temperature) of 100° C. was depressurized to atmospheric pressure—0.1 MPa by a vacuum pump. The base compound liquid and the curing agent liquid of an epoxy resin composition pre-heated beforehand to a temperature of 50° C. were mixed and injected at a pressure of 0.2 MPa by using a resin injector. At 20 minutes after the injection of the epoxy resin composition was started, the mold die was opened and mold release was performed to obtain a fiber reinforced composite material.

Resin Impregnating Property with Respect to Reinforcing Fiber

With regard to the impregnating property in the resin injection step during the manufacture of the fiber reinforced composite material mentioned above, comparative evaluation was carried on the basis of the following three grades with reference to the amount of void in the fiber reinforced composite material. An impregnating property such that the amount of void in a fiber reinforced composite material was less than 1%, that is, void was substantially not present, was determined as "A", an impregnating property such that a not-resin-impregnated portion was not recognized in the external appearance of a fiber reinforced composite material but the amount of void in the fiber reinforced composite material was greater than or equal to 1% was determined as "B", and an impregnating property such that a not-resin-impregnated portion was recognized in the external appearance of a fiber reinforced composite material was determined as "C".

The amount of void in the fiber reinforced composite material was calculated from an area ratio of the void in the fiber reinforced composite material in the observation of a smoothly polished fiber reinforced composite material section surface under an epi-illumination type optical microscope.

Ease of Mold Release Operation of Fiber Reinforced Composition Material

With regard to the ease of operation in the mold release step during the manufacture of the fiber reinforced composite material mentioned above, comparative evaluation was carried out on the basis of the following three grades. An ease of operation such that when the fiber reinforced composite material, after the mold die was opened, was detached from the mold die by using a spatula, mold release was easy without resistance was determined as "A", an ease operation such that mold release was carried out with some resistance but without the fiber reinforced composite material being plastically deformed (which was practically inferior to "A" because the mold release operation required time) was determined as "B", and an ease of operation such that mold release was difficult or, at the time of mold release, the fiber reinforced composite material was plastically deformed was determined as "C".

With Regard to Inhibition of Occurrence of Burrs on Fiber Reinforced Composite Material With regard to occurrence of burrs on the fiber reinforced composite materials manufactured by the foregoing method, comparative evaluation was carried out on the basis of the following three grades. Such inhibition that no burr was formed was determined as "A", such inhibition that burrs were slightly formed was determined as "B", and such inhibition that burrs were formed all around the perimeter was determined as "C".

Epoxy resin compositions were prepared by mixing as mentioned above according to the blending ratios in Tables 1 to 4, and were subjected to viscosity measurement and dielectric measurement as mentioned above. Furthermore, cured resin plates were manufactured from these epoxy resin compositions by the method mentioned above, and subjected to glass transition temperature Tg measurement and coloration evaluation. Still further, using epoxy resin compositions, fiber reinforced composite materials were manufactured by the method mentioned above.

Example 1

As shown in Table 1, an epoxy resin composition was prepared through mixture of a base compound liquid made up of 100 mass parts of a bisphenol A type epoxy resin '"Epotohto" (registered trademark) YD-128' and a curing agent liquid obtained by mutually dissolving 6 mass parts of tetramethyl ammonium bromide with 89 mass parts of an acid anhydride "HN-5500" while heating them at 80° C. As for this epoxy resin composition, even when it was kept at a temperature of 40° C., the viscosity increase rate remained low and a low viscosity state was maintained. Furthermore, we found that because the mold releasable time represented by t90 at a temperature of 120° C. was short, this composition was effective in shortening the forming time in the forming of the fiber reinforced composite material. Furthermore, as for an cured product of this epoxy resin composition, Tg exceeded the molding temperature (120° C.), and no coloration occurred. Therefore, a fiber reinforced composite material manufactured by using this epoxy resin composition allowed a molded product to be easily released from the mold die without being deformed at the time of extracting the molded product from the mold die. Results are shown in Table 1.

Examples 2 and 3

Examples 2 and 3 were carried out in substantially the same manner as in Example 1, except that the amounts of tetramethyl ammonium bromide were 18 mass parts (Example 2) and 25 mass parts (Example 3), respectively. Each was excellent in viscosity stability at 40° C. and had a short mold releasable time. Furthermore, as for cured products of the epoxy resin compositions of these examples, Tg exceeded the molding temperature (120° C.) and no coloration occurred. Therefore, fiber reinforced composite materials manufactured by using the epoxy resin compositions allowed molded products to be easily released from the mold dies without being deformed at the time extracting the molded products from the mold dies. Results are shown in Table 1.

Examples 4 and 5

Examples 4 and 5 were carried out in substantially the same manner as in Example 1, except that base compound liquids made up of 100 mass parts of a bisphenol F type epoxy resin '"Epotohto" (registered trademark) YDF-170' and, for curing agent liquids, 74 mass parts of an acid anhydride "HN-5500", 26 mass parts of '"KAYAHARD" (registered trademark) MCD', and 7 mass parts in Example 4 and 23 mass parts in Example 5 of tetramethyl ammonium chloride were employed. Each was excellent in viscosity stability at 40° C. and had a short mold releasable time. Furthermore, as for cured products of epoxy resin compositions of these examples, Tg exceeded the molding temperature (120° C.) and no coloration occurred. Therefore, fiber reinforced composite materials manufactured by using the epoxy resin compositions allowed molded products to be released from the mold dies without being deformed at the time extracting the molded products from the mold dies. Results are shown in Table 1.

Examples 6 and 7

Examples 6 and 7 were carried out in substantially the same manner as in Example 1, except that base compound liquids made up of 75 mass parts of a bisphenol A type epoxy resin '"jER" (registered trademark) 1001' and 25 mass parts of an alicyclic epoxy resin '"CELLOXIDE" (registered trademark) 2021P' and, for curing agent liquids, 100 mass parts of an acid anhydride "HN-5500" and 6 mass parts in Example 6 and 22 mass parts in Example 7 of trimethylphenyl ammonium bromide were employed. Each was excellent in viscosity stability at 40° C. and had a mold releasable time. Furthermore, as for cured products of epoxy resin compositions of these examples, Tg exceeded the molding temperature (120° C.) and no coloration occurred. Therefore, fiber reinforced composite materials manufactured by using the epoxy resin compositions allowed molded products to be easily released from the mold dies without being deformed at the time extracting the molded products from the mold dies. Results are shown in Table 1.

Comparative Examples 1 and 2

Comparative examples 1 and 2 were carried out in substantially the same manner as in Example 1, except that the amounts of tetramethyl ammonium bromide were 2 mass parts and 4 mass parts, respectively. As for each comparative example, the viscosity stability at 40° C. was excellent, but the amount of the component [C] was insufficient and the curing time was longer than in the examples. Therefore, fiber reinforced composite materials manufactured by using these epoxy resin compositions had long mold releasable times and were inferior in productivity at the time of molding. Results are shown in Table 1.

Comparative Example 3

Comparative example 3 was carried out in substantially the same manner as in Example 1, except that the amount of tetramethyl ammonium bromide was 40 mass parts. The amount of the component [C] was excessively large, the viscosity increase at 40° C. was conspicuous, and the viscosity stability of the epoxy resin composition at 40° C. was inferior. Therefore, when a fiber reinforced composite material was to be manufactured by using the epoxy resin composition, the impregnating property of the resin with respect to the reinforcing fiber was inferior. Furthermore, as for a cured product of the epoxy resin composition, Tg was below the molding temperature (120° C.). Therefore, when the fiber reinforced composite material was released from the mold die, the fiber reinforced composite material deformed. Results are shown in Table 1.

Comparative Example 4

Comparative example 4 was carried out in substantially the same manner as in Example 1, except that a base compound liquid made up of 100 mass parts of a bisphenol F type epoxy resin '"Epotohto" (registered trademark) YDF-170' and, for a curing agent liquid, 99 mass parts of an acid anhydride "HN-5500" and 6 mass parts of triethylene diamine were employed. In this comparative example, since the component [C] was not contained, the curing time was longer than in the examples. As for the forming of a fiber reinforced composite material by using the epoxy resin composition, the productivity was inferior, the cured product was colored, and the quality of the formed product decreased. Results are shown in Table 1.

Comparative Example 5

Comparative example 5 was carried out in substantially the same manner as in Example 1, except that a base compound liquid made up of 100 mass parts of a bisphenol A type epoxy resin '"Epotohto" (registered trademark) YD-128' and, for a curing agent liquid, 18 mass parts of metaxylene diamine, without the component [B] nor the component [C] included, were employed. In this comparative example, since neither the component [B] nor the component [C] was contained, the viscosity of the epoxy resin composition was high, the viscosity increase rate was high, and the stability of viscosity was inferior. Therefore, in the forming of the fiber reinforced composite material through the use of this epoxy resin composition, the impregnating property with respect to reinforcing fiber was inferior. Results are shown in Table 1.

Comparative Example 6

Comparative example 6 was carried out in substantially the same manner as in Example 1, except that 10 mass parts of tri-p-tolyl phosphine was employed instead of the component [C]. In this comparative example, the curing time was short but the curing at a temperature of 120° C. was accompanied by coloration. Results are shown in Table 1.

Example 8

As shown in Table 2, an epoxy resin composition was prepared from a base compound liquid made up of 100 mass parts of a bisphenol F type epoxy resin '"Epotohto" (registered trademark) YDF-170' and a curing agent liquid obtained by mutually dissolving 6 mass parts of ethyl triphenylphosphonium bromide with 74 mass parts of an acid anhydride "HN-5500" and 26 mass parts of '"KAYA-HARD" (registered trademark) MCD' while heating at 90° C. as a curing agent liquid. This epoxy resin composition, when kept at a temperature of 40° C., exhibited a sharp viscosity increase until after 5 minutes following the mixing preparation and, until after 20 minutes after that, viscosity increase was restrained and a low viscosity state was maintained. Furthermore, we found that because the mold releasable time represent by t90 at a temperature of 120° C. was short, this composition was effective in shortening the forming time in the forming of the fiber reinforced composite material. Furthermore, as for an cured product of this epoxy resin composition, Tg exceeded the molding temperature (120° C.), and no coloration occurred. A fiber reinforced composite material manufactured by using this epoxy resin composition allowed a molded product to be easily released from the mold die without being deformed at the time of extracting the molded product from the mold die and produced fewer burrs on the molded product. Results are shown in Table 2.

Examples 9 and 10

Examples 9 and 10 were carried out in substantially the same manner as in Example 8, except that Examples 9 and 10 respectively used amounts of ethyl triphenylphosphonium bromide shown in Table 2. As for each example, the viscosity increase after mixing preparation and the viscosity stability after that at 40° C. were excellent, and the mold releasable time was short. Furthermore, as for cured products of these epoxy resin compositions, Tg exceeded the molding temperature (120° C.), and no coloration occurred. Therefore, fiber reinforced composite materials manufactured by using these epoxy resin compositions allowed molded products to be easily released from the mold dies without being deformed at the time of extracting the molded products from the mold dies and produced fewer burrs on the molded products. Results are shown in Table 2.

Examples 11 to 13

Examples 11 to 13 were carried out in substantially the same manner as in Example 8, except that base compound liquids made up of a bisphenol A type epoxy resin '"Epotohto" (registered trademark) YD-128' and, for curing agent liquids, an acid anhydride "HN-5500" and tetraphenylphosphonium bromide were employed respectively in the amounts shown in Table 2. As for each example, the viscosity increase following the mixing preparation and the viscosity stability at 40° C. were excellent, and the mold releasable time was short. Furthermore, as for cured products of these epoxy resin compositions, Tg exceeded the molding temperature (120° C.), and no coloration occurred. Therefore, fiber reinforced composite materials manufactured by using these epoxy resin compositions allowed molded products to be easily released from the mold dies without being deformed at the time of extracting the molded products from the mold dies and produced fewer burrs on the molded products. Results are shown in Table 2.

Examples 14 and 15

Examples 14 and 15 were carried out in substantially the same manner as in Example 8, except that base compound liquids obtained by combining a bisphenol A type epoxy resin '"Epotohto" (registered trademark) YD-128' and '"CELLOXIDE" (registered trademark) 2021P' and mutually dissolving them at a room temperature of 25° C. and, for curing agent liquids, an acid anhydride "HN-5500" and tetraphenylphosphonium bromide were employed in the amounts shown in Table 2. As for each example, the viscosity increase following the mixing preparation and the viscosity stability at 40° C. were excellent, and the mold releasable time as short. Furthermore, as for cured products of these epoxy resin compositions, Tg was near the molding temperature (120° C.), and no coloration occurred. Therefore, fiber reinforced composite materials manufactured by using these epoxy resin compositions allowed molded products to be easily released from the mold dies without being deformed at the time of extracting the molded products from the mold dies and produced fewer burrs on the molded products. Results are shown in Table 2.

Examples 16 to 18

Examples 16 to 18 were carried out in substantially the same manner as in Example 8, except that, as shown in Table 2, base compound liquids obtained by combining a bisphenol A type epoxy resin '"jER" (registered trademark) 1001' and a bisphenol F type epoxy resin '"Epotohto" (registered trademark) YDF-170' and mutually dissolving them while heating at 90° C. and, for curing agent liquids, an acid anhydride 'HN-5500" and tetraphenylphosphonium chloride were employed in the amounts shown in Table 2. As for each example, the viscosity increase following the mixing preparation and the viscosity stability at 40° C. were excellent, and the mold releasable time was short. Furthermore, as for cured products of these epoxy resin compositions, Tg was near the molding temperature (120° C.), and no coloration occurred. Therefore, fiber reinforced composite materials manufactured by using these epoxy resin compositions allowed molded products to be easily released from the mold dies without being deformed at the time of extracting the molded products from the mold dies and produced less burrs on the molded products. Results are shown in Table 2.

Comparative Example 7

Comparative Example 7 was carried out in substantially the same manner as in Example 12, except that the amount of ethyl triphenylphosphonium bromide was 5 mass parts. Although the viscosity increase following the mixing preparation and the viscosity stability at 40° C. were excellent, the amount of the component [C] was insufficient, and the curing time was longer than in the examples. Furthermore, the viscosity increase after the mixing preparation was insufficient. A fiber reinforced composite material manufactured by using the epoxy resin composition produced many burrs during the forming and resulted in decreased molding quality. Results are shown in Table 2.

Comparative Example 8

Comparative example 8 was carried out in substantially the same manner as in Example 14, except that the amount of tetraphenylphosphonium bromide was 30 parts. The amount of the component [C] was excessively large, the viscosity increase at 40° C. was conspicuous, and the viscosity stability at 40° C. was inferior. Therefore, a fiber reinforced composite material manufactured by using this epoxy resin composition was inferior in the impregnating property with respect to the reinforcing fiber, and was deformed when extracted from the mold die, and was inferior in productivity. Results are shown in Table 2.

Comparative Example 9

Comparative example 9 was carried out in substantially the same manner as in Example 12, except that 17 mass parts of tetraphenylphosphonium tetra-p-tolyl borate was used instead of the component [C]. In Comparative example 9, since the component [C] was not contained, the curing time was longer than in the examples. Furthermore, as for the viscosity increase following the mixing preparation, as shown in Table 3, the viscosity increase following the mixing preparation was unmanifested at 30° C. and 60° C. as well as 40° C. The molding of a fiber reinforced composite material through the use of this epoxy resin composition was accompanied by many burrs formed on the molded product, and thus deteriorated in quality. Results are shown in Table 2.

Comparative Example 10

Comparative example 10 was carried out in substantially the same manner as in Example 12, except that 18 mass parts of tetrabutylphosphonium decanoate was used instead of the component [C]. In Comparative example 10, since the component [C] was not contained, the curing time was longer than in the examples. Furthermore, as for the viscosity increase following the mixing preparation, as shown in Table 3, the viscosity increase following the mixing preparation was unmanifested at 30° C. and 60° C. as well as 40° C. The molding of a fiber reinforced composite material through the use of this epoxy resin composition was accompanied by many burrs formed on the molded product, and thus deteriorated in quality. Results are shown in Table 2.

Comparative Example 11

Comparative example 11 was carried out in substantially the same manner as in Example 8, except that, for a curing agent liquid, the acid anhydride "HN-5500", and 10 mass parts of tri-p-tolyl phosphine instead of the component [C] were employed. In this comparative example, although the curing time was short, the curing at a temperature of 120° C. was accompanied by coloration. Furthermore, as for the viscosity increase following the mixing preparation, the viscosity increase following the mixing preparation was unmanifested at 30° C. and 60° C. as well as 40° C., as shown in Table 3. Many burrs were formed on the molded product, and then the quality of the molded product decreased. Results are shown in Table 2.

Example 19

As shown in Table 4, an epoxy resin composition was prepared through mixture of a base compound liquid made up of 100 mass parts of a bisphenol A type epoxy resin '"Epotohto" (registered trademark) YD-128' and a curing agent liquid obtained by mutually dissolving 6 mass parts of 1-butyl-3-methylimidazolium chloride with 89 mass parts of the acid anhydride "HN-5500" while heating at 80° C. As for this epoxy resin composition, even when it was kept at a temperature of 40° C., the viscosity increase rate remained low and a low viscosity state was maintained. Furthermore, we found that because the mold releasable time represented by t90 at a temperature of 120° C. was short, this composition was effective in shortening the forming time in the forming of the fiber reinforced composite material. Furthermore, as for an cured product of this epoxy resin composition, Tg exceeded the molding temperature (120° C.), and no coloration occurred. Therefore, a fiber reinforced composite material manufactured by using this epoxy resin composition allowed a molded product to be easily released from the mold die without being deformed at the time of extracting the molded product from the mold die. Results are shown in Table 4.

Examples 20 to 22

Examples 20 to 22 were carried out in substantially the same manner as in Example 19, except that 1-butyl-3-methylimidazolium chloride was used in the amounts of 10 mass parts (Example 20), 18 mass parts (Example 21), and 25 mass parts (Example 22), respectively. As for each example, the viscosity stability at 40° C. was excellent and the mold releasable time was short. Furthermore, as for cured products of epoxy resin compositions of these examples, Tg exceeded the molding temperature (120° C.) and no coloration occurred. Therefore, fiber reinforced composite materials manufactured by using the epoxy resin compositions allowed molded products to be easily released from the mold dies without being deformed at the time extracting the molded products from the mold dies. Results are shown in Table 4.

Examples 23 and 24

Examples 23 and 24 were carried out in substantially the same manner as in Example 19, except that base compound liquids made up of 100 mass parts of a bisphenol F type epoxy resin '"Epotohto" (registered trademark) YDF-170' and, for curing agent liquid, 74 mass parts of an acid anhydride "HN-5500", 26 mass parts of '"KAYAHARD" (registered trademark) MCD', and 7 mass parts (Example 23) and 24 mass parts (Example 24) of 1-butyl-3-methylimidazolium bromide were employed. As for each example, the viscosity stability at 40° C. was excellent and the mold releasable time was short. Furthermore, as for cured products of the epoxy resin compositions of these examples, Tg was above or near the molding temperature (120° C.) and no coloration occurred. Therefore, fiber reinforced composite materials manufactured by using the epoxy resin compositions allowed molded products to be easily released from the mold dies without being deformed at the time extracting the molded products from the mold dies. Results are shown in Table 4.

Examples 25 and 26

Examples 25 and 26 were carried out in substantially the same manner as in Example 19, except that base compound liquids made up of 75 mass parts of a bisphenol A type epoxy resin '"jER" (registered trademark) 1001' and 25 mass parts of an alicyclic epoxy resin '"CELLOXIDE" (registered trademark) 2021P' and, for curing agent liquids, 100 mass parts of the acid anhydride "HN-5500" and 6 mass parts (Example 25) and 22 mass parts (Example 26) of 1-ethyl-3-methylimidazolium bromide were employed. As for each example, the viscosity stability at 40° C. was excellent and the mold releasable time was short. Furthermore, as for cured products of epoxy resin compositions of these examples, Tg exceeded the molding temperature (120° C.) and no coloration occurred. Therefore, fiber reinforced composite materials manufactured by using the epoxy resin compositions allowed molded products to be easily released from the mold dies without being deformed at the time extracting the molded products from the mold dies. Results are shown in Table 4.

Comparative Example 12

Comparative example 12 was carried out in substantially the same manner as in Example 19, except that the amount of 1-butyl-3-methylimidazolium chloride was 4 mass parts. As for each, the viscosity stability at 40° C. was excellent but the amount of the component [C] was insufficient and the curing time was longer than in the examples. Therefore, fiber reinforced composite materials manufactured by using this epoxy resin composition had long mold releasable times and was inferior in productivity at the time of molding. Results are shown in Table 4.

Comparative Example 13

Comparative example 13 was carried out in substantially the same manner as in Example 19, except that the amount of 1-butyl-3-methylimidazolium chloride was 40 mass parts. The amount of the component [C] was excessively large, the viscosity increase at 40° C. was conspicuous, and the viscosity stability of the epoxy resin composition at 40° C. was inferior. Therefore, when a fiber reinforced composite material was to be manufactured by using the epoxy resin composition, the impregnating property of the resin with respect to the reinforcing fiber was inferior. Furthermore, as for a cured product of the epoxy resin composition, Tg was below the molding temperature (120° C.). Therefore, when the fiber reinforced composite material was released from the mold die, the fiber reinforced composite material deformed. Results are shown in Table 4.

Comparative Example 14

Comparative example 14 was carried out in substantially the same manner as in Example 19, except that, instead of the component [C] 10 mass parts of 1,2-dimethyl imidazole was used. In Comparative example 14, since the component [C] was not contained, the viscosity increase rate at 40° C. after 20 minutes was high and the stability of viscosity was inferior in comparison with the examples. Therefore, in the forming of a fiber reinforced composite material through the use of the epoxy resin composition, the impregnating property with respect to the reinforcing fiber was inferior and the cured product was colored. Results are shown in Table 4.

Comparative Example 15

Comparative example 15 was carried out in substantially the same manner as in Example 19, except that a base compound liquid made up of 100 mass parts of a bisphenol A type epoxy resin '"Epotohto" (registered trademark) YD-128' and, for a curing agent liquid, 10 mass parts of 2-ethyl-4-methyl imidazole, without inclusion of the component [B] nor the component [C], were employed. In this comparative example, since neither the component [B] nor the component [C] was contained, the viscosity of the epoxy resin composition was high. Furthermore, because the viscosity increase rate is high and the stability of viscosity is inferior. Therefore, in the forming of a fiber reinforced composite material through the use of the epoxy resin composition, the impregnating property with respect to the reinforcing fiber was inferior and a cured product was colored. Results are shown in Table 4.

As described above, the epoxy resin composition was suitable for the forming of a fiber reinforced composite material and, using the RTM process or the like, can provide a fiber reinforced composite material excellent in external appearance and surface quality with high productivity in a short time. Furthermore, the epoxy epoxy resin composition is also excellent in the forming of fiber reinforced composite material of large configurations, and is particularly suitable for applications to motor vehicle members.

TABLE 1

|  |  |  | Example 1 | Example 2 | Example 3 | Example 4 | Example 5 | Example 6 | Example 7 |
|---|---|---|---|---|---|---|---|---|---|
| Epoxy resin composition | [A] Epoxy resin | jER1001 |  |  |  |  |  | 75 | 75 |
|  |  | YD-128 | 100 | 100 | 100 |  |  |  |  |
|  |  | YDF-170 |  |  |  | 100 | 100 |  |  |
|  |  | CELLOXIDE 2021P |  |  |  |  |  | 25 | 25 |
|  | [B] Acid anhydride | HN-5500 | 89 | 89 | 89 | 74 | 74 | 100 | 100 |
|  |  | KAYAHARD MCD |  |  |  | 26 | 26 |  |  |

TABLE 1-continued

|  |  |  | | | | | | | |
|---|---|---|---|---|---|---|---|---|---|
| [C] Quaternary ammonium salt | | Tetramethyl ammonium bromide | 6 | 18 | 25 | | | | |
| | | Tetramethyl ammonium chloride | | | | 7 | 23 | | |
| | | Trimethylphenyl ammonium bromide | | | | | | 6 | 22 |
| Other substances | | Triethylene diamine | | | | | | | |
| | | Metaxylene diamine | | | | | | | |
| | | Tri-p-tolyl phosphine | | | | | | | |
| | | H/E ratio | 1.0 | 1.0 | 1.0 | 1.0 | 1.0 | 1.0 | 1.0 |
| Properties of uncured resin | | Viscosity of composition at 40° C. during early period (after 1 min. after mixing) [mPa·s] | 326 | 979 | 1884 | 139 | 602 | 296 | 1530 |
| | | Viscosity of composition at 40° C. after 5 min. after mixing) [mPa·s] | 335 | 1080 | 2230 | 146 | 760 | 312 | 1770 |
| | | (ratio to viscosity after 1 min. after mixing) | 1.0 | 1.1 | 1.2 | 1.1 | 1.3 | 1.1 | 1.2 |
| | | Viscosity of composition at 40° C. after 20 min. after mixing) [mPa·s] | 359 | 1370 | 3200 | 167 | 1200 | 355 | 2450 |
| | | (ratio to viscosity after 5 min. after mixing) | 1.1 | 1.3 | 1.4 | 1.1 | 1.6 | 1.1 | 1.4 |
| | | t10 at 120° C. [min.] | 1.6 | 0.6 | 0.5 | 1.7 | 0.6 | 1.7 | 0.7 |
| | | t90 at 120° C. [min.] | 3.7 | 1.4 | 1.2 | 3.9 | 1.5 | 4.0 | 1.7 |
| Properties of cured resin product | | 120° C. cured product's glass transition temperature [° C.] | 128 | 126 | 123 | 123 | 120 | 129 | 123 |
| | | Cured product coloration | Absent | Absent | Absent | Absent | Absent | Absent | Absent |
| Moldability of fiber reinforced composite material | | Impregnating property with respect to reinforcing fiber | A | A | B | A | A | A | B |
| | | Ease of mold release operation | A | A | A | A | B | A | A |

| | | | Comparative example 1 | Comparative example 2 | Comparative example 3 | Comparative example 4 | Comparative example 5 | Comparative example 6 |
|---|---|---|---|---|---|---|---|---|
| Epoxy resin composition | [A] Epoxy resin | jER1001 | | | | | | |
| | | YD-128 | 100 | 100 | 100 | | 100 | 100 |
| | | YDF-170 | | | | 100 | | |
| | | CELLOXIDE 2021P | | | | | | |
| | [B] Acid anhydride | HN-5500 | 89 | 89 | 89 | 99 | | 89 |
| | | KAYAHARD MCD | 2 | 4 | 40 | | | |
| | [C] Quaternary ammonium salt | Tetramethyl ammonium bromide | | | | | | |
| | | Tetramethyl ammonium chloride | | | | | | |
| | | Trimethylphenyl ammonium bromide | | | | | | |
| | Other substances | Triethylene diamine | | | | 6 | | |
| | | Metaxylene diamine | | | | | 18 | |
| | | Tri-p-tolyl phosphine | | | | | | 10 |
| | | H/E ratio | 1.0 | 1.0 | 1.0 | 1.0 | 1.0 | 1.0 |
| Properties of uncured resin | | Viscosity of composition at 40° C. during early period (after 1 min. after mixing) [mPa·s] | 223 | 259 | 7597 | 123 | 378 | 143 |
| | | Viscosity of composition at 40° C. after 5 min. after mixing) [mPa·s] | 229 | 266 | 10200 | 126 | 1470 | 173 |
| | | (ratio to viscosity after 1 min. after mixing) | 1.0 | 1.0 | 1.3 | 1.0 | 3.9 | 1.2 |
| | | Viscosity of composition at 40° C. after 20 min. after mixing) [mPa·s] | 245 | 285 | 17500 | 135 | 4540 | 257 |

TABLE 1-continued

|  |  |  |  |  |  |  |  |
|---|---|---|---|---|---|---|---|
|  | (ratio to viscosity after 5 min. after mixing) | 1.1 | 1.1 | 1.7 | 1.1 | 3.1 | 1.5 |
|  | t10 at 120° C. [min.] | 3.5 | 2.6 | 0.4 | 1.4 | 0.9 | 1.4 |
|  | t90 at 120° C. [min.] | 8.2 | 6.0 | 0.9 | 13 | 4.0 | 3.0 |
| Properties of cured resin product | 120° C. cured product's glass transition temperature [° C.] | 129 | 129 | 114 | 120 | 125 | 124 |
|  | Cured product coloration | Absent | Absent | Absent | Present | Present | Present |
| Moldability of fiber reinforced composite material | Impregnating property with respect to reinforcing fiber | A | A | C | A | C | A |
|  | Ease of mold release operation | A | A | C | B | A | A |

TABLE 2

|  |  |  | Example 8 | Example 9 | Example 10 | Example 11 | Example 12 | Example 13 | Example 14 | Example 15 |
|---|---|---|---|---|---|---|---|---|---|---|
| Epoxy resin composition | Component [A] Epoxy resin | jER1001 |  |  |  |  |  |  |  |  |
|  |  | YD-128 |  |  |  | 100 | 100 | 100 | 66 | 66 |
|  |  | YDF-170 | 100 | 100 | 100 |  |  |  |  |  |
|  |  | CELLOXIDE 2021P |  |  |  |  |  |  | 34 | 34 |
|  | Component [B] Acid anhydride | HN-5500 | 74 | 74 | 74 | 89 | 89 | 89 | 100 | 100 |
|  |  | KAYAHARD MCD | 26 | 26 | 26 |  |  |  |  |  |
|  | Component [C] Quaternary phosphonium halide | Tetraphenyl-phosphonium bromide |  |  |  | 6 | 10 | 16 | 20 | 25 |
|  |  | Ethyl triphenyl-phosphonium bromide | 6 | 10 | 16 |  |  |  |  |  |
|  |  | Tetraphenyl-phosphonium chloride |  |  |  |  |  |  |  |  |
|  | Other substances | Tetraphenyl-phosphonium tetra-p-tolyl borate |  |  |  |  |  |  |  |  |
|  |  | Tetrabutyl-phosphonium decanoate |  |  |  |  |  |  |  |  |
|  |  | Tri-p-tolyl phosphine |  |  |  |  |  |  |  |  |
|  |  | H/E ratio | 1.0 | 1.0 | 1.0 | 1.0 | 1.0 | 1.0 | 1.0 | 1.0 |
| Properties of uncured resin | Viscosity of composition at 40° C. during early period (after 1 min. after mixing) [mPa·s] |  | 172 | 180 | 187 | 224 | 235 | 244 | 192 | 207 |
|  | Viscosity of composition at 40° C. after 5 min. after mixing) [mPa·s] |  | 258 | 352 | 525 | 371 | 570 | 824 | 550 | 753 |
|  | (ratio to viscosity after 1 min. after mixing) |  | 1.5 | 2.0 | 2.8 | 1.7 | 2.4 | 3.4 | 2.9 | 3.6 |
|  | Viscosity of composition at 40° C. after 20 min. after mixing) [mPa·s] |  | 284 | 398 | 630 | 490 | 665 | 1087 | 825 | 1280 |
|  | (ratio to viscosity after 5 min. after mixing) |  | 1.1 | 1.1 | 1.2 | 1.3 | 1.2 | 1.3 | 1.5 | 1.7 |
|  | t90 at 120° C. [min.] |  | 4.0 | 2.9 | 1.9 | 3.7 | 2.5 | 1.6 | 3.6 | 2.4 |
| Properties of cured resin product | Cured product's glass transition temperature [° C.] |  | 123 | 122 | 121 | 125 | 127 | 122 | 124 | 123 |
|  | Cured product coloration |  | Absent | Absent | Absent | Absent | Absent | Absent | Absent | Absent |
|  | Impregnating property with respect |  | A | A | A | A | A | A | A | A |

TABLE 2-continued

| | | | | | | | Comparative example 7 | Comparative example 8 | Comparative example 9 | Comparative example 10 | Comparative example 11 |
|---|---|---|---|---|---|---|---|---|---|---|---|
| Moldability of fiber reinforced composite material | to reinforcing fiber Ease of mold release operation | A | A | A | A | A | A | A | A | | | |
| | Inhibition of burr occurrence | A | A | A | A | A | A | A | A | | | |

| | | | Example 16 | Example 17 | Example 18 | Comparative example 7 | Comparative example 8 | Comparative example 9 | Comparative example 10 | Comparative example 11 |
|---|---|---|---|---|---|---|---|---|---|---|
| Epoxy resin composition | Component [A] Epoxy resin | jER1001 | 25 | 25 | 25 | | | | | |
| | | YD-128 | | | | 100 | 66 | 100 | 100 | |
| | | YDF-170 | 75 | 75 | 75 | | | | | 100 |
| | | CELLOXIDE 2021P | | | | | 34 | | | |
| | Component [B] Acid anhydride | HN-5500 KAYAHARD MCD | 83 | 83 | 83 | 89 | 100 | 89 | 89 | 100 |
| | Component [C] Quaternary phosphonium halide | Tetraphenyl-phosphonium bromide | | | | 5 | 30 | | | |
| | | Ethyl triphenyl-phosphonium bromide | | | | | | | | |
| | | Tetraphenyl-phosphonium chloride | 6 | 10 | 16 | | | | | |
| | Other substances | Tetraphenyl-phosphonium tetra-p-tolyl borate | | | | | | 17 | | |
| | | Tetrabutyl-phosphonium decanoate | | | | | | | 18 | |
| | | Tri-p-tolyl phosphine | | | | | | | | 10 |
| | H/E ratio | | 1.0 | 1.0 | 1.0 | 1.0 | 1.0 | 1.0 | 1.0 | 1.0 |
| Properties of uncured resin | Viscosity of composition at 40° C. during early period (after 1 min. after mixing) [mPa · s] | | 273 | 287 | 298 | 220 | 289 | 429 | 320 | 178 |
| | Viscosity of composition at 40° C. after 5 min. after mixing) [mPa · s] | | 410 | 459 | 507 | 303 | 1189 | 429 | 352 | 178 |
| | (ratio to viscosity after 1 min. after mixing) | | 1.5 | 1.6 | 1.7 | 1.4 | 4.1 | 1.0 | 1.1 | 1.0 |
| | Viscosity of composition at 40° C. after 20 min. after mixing) [mPa · s] | | 697 | 826 | 912 | 451 | 2140 | 472 | 422 | 249 |
| | (ratio to viscosity after 5 min. after mixing) | | 1.7 | 1.8 | 1.8 | 1.5 | 1.8 | 1.1 | 1.2 | 1.4 |
| | t90 at 120° C. [min.] | | 3.9 | 2.7 | 1.8 | 5.1 | 1.5 | 10.9 | 7.8 | 2.7 |
| Properties of cured resin product | Cured product's glass transition temperature [° C.] | | 123 | 122 | 121 | 124 | 118 | 121 | 123 | 131 |
| | Cured product coloration | | Absent | Absent | Absent | Absent | Absent | Absent | Absent | Present |
| Moldability of fiber reinforced composite material | Impregnating property with respect to reinforcing fiber | | A | A | A | A | C | A | A | A |
| | Ease of mold release operation | | A | A | A | A | C | B | A | A |
| | Inhibition of burr occurrence | | B | B | A | C | A | C | C | C |

TABLE 3

|  |  |  | Comparative example 9 | Comparative example 10 | Comparative example 11 |
|---|---|---|---|---|---|
| Epoxy resin composition | Component [A] Epoxy resin | YD-128 | 100 | 100 |  |
|  |  | YDF-170 |  |  | 100 |
|  | Component [B] Acid anhydride | HN-5500 | 89 | 89 | 100 |
|  | Other substances | Tetraphenylphosphonium tetra-p-tolyl borate | 17 |  |  |
|  |  | Tetrabutylphosphonium decanoate |  | 18 |  |
|  |  | Tri-p-tolyl phosphine |  |  | 10 |
|  |  | H/E ratio | 1.0 | 1.0 | 1.0 |
| Properties of uncured resin |  | Viscosity of composition at 30° C. during early period (after 1 min. after mixing) [mPa · s] | 830 | 661 | 344 |
|  |  | Viscosity of composition at 30° C. after 5 min. after mixing [mPa · s] | 842 | 755 | 347 |
|  |  | (ratio to viscosity after 1 min. after mixing) | 1.0 | 1.1 | 1.0 |
|  |  | Viscosity of composition at 30° C. after 20 min. after mixing [mPa · s] | 931 | 935 | 415 |
|  |  | (ratio to viscosity after 5 min. after mixing) | 1.1 | 1.2 | 1.2 |
|  |  | Viscosity of composition at 60° C. during early period (after 1 min. after mixing) [mPa · s] | 106 | 82 | 44 |
|  |  | Viscosity of composition at 60° C. after 5 min. after mixing [mPa · s] | 115 | 91 | 49 |
|  |  | (ratio to viscosity after 1 min. after mixing) | 1.1 | 1.1 | 1.1 |
|  |  | Viscosity of composition at 60° C. after 20 min. after mixing [mPa · s] | 123 | 133 | 110 |
|  |  | (ratio to viscosity after 5 min. after mixing) | 1.1 | 1.5 | 2.2 |

TABLE 4

|  |  |  | Example 19 | Example 20 | Example 21 | Example 22 | Example 23 | Example 24 |
|---|---|---|---|---|---|---|---|---|
| Epoxy resin composition | [A] Epoxy resin | jER1001 |  |  |  |  |  |  |
|  |  | YD-128 | 100 | 100 | 100 | 100 |  |  |
|  |  | YDF-170 |  |  |  |  | 100 | 100 |
|  |  | CELLOXIDE 2021P |  |  |  |  |  |  |
|  | [B] Acid anhydride | HN-5500 | 89 | 89 | 89 | 89 | 74 | 74 |
|  |  | KAYAHARD MCD |  |  |  |  | 26 | 26 |
|  | [C] Imidazolium salt | 1-butyl-3-methylimidazolium chloride | 6 | 10 | 18 | 25 |  |  |
|  |  | 1-butyl-3-methylimidazolium bromide |  |  |  |  | 7 | 24 |
|  |  | 1-ethyl-3-methylimidazolium bromide |  |  |  |  |  |  |
|  | Other substances | 1,2-dimethyl imidazole |  |  |  |  |  |  |
|  |  | 2-ethyl-4-methyl imidazole |  |  |  |  |  |  |
|  |  | H/E ratio | 1.0 | 1.0 | 1.0 | 1.0 | 1.0 | 1.0 |
| Properties of uncured resin |  | Viscosity of composition at 40° C. during early period (after 1 min. after mixing) [mPa · s] | 213 | 263 | 560 | 1034 | 128 | 341 |
|  |  | Viscosity of composition at 40° C. after 5 min. after mixing [mPa · s] | 224 | 284 | 634 | 1250 | 141 | 422 |
|  |  | (ratio to viscosity after 1 min. after mixing) | 1.1 | 1.1 | 1.1 | 1.2 | 1.1 | 1.2 |
|  |  | Viscosity of composition at 40° C. after 20 min. after mixing [mPa · s] | 256 | 342 | 840 | 1880 | 179 | 648 |
|  |  | (ratio to viscosity after 5 min. after mixing) | 1.1 | 1.2 | 1.3 | 1.5 | 1.3 | 1.5 |
|  |  | t10 at 120° C. [min.] | 1.9 | 1.3 | 0.9 | 0.7 | 2.0 | 1.1 |
|  |  | t90 at 120° C. [min.] | 4.8 | 3.4 | 2.1 | 1.6 | 4.9 | 2.0 |

TABLE 4-continued

| | | | | | | | |
|---|---|---|---|---|---|---|---|
| Properties of cured resin product | 120° C. cured product's glass transition temperature [° C.] | 128 | 127 | 125 | 123 | 123 | 120 |
| | Cured product coloration | Absent | Absent | Absent | Absent | Absent | Absent |
| Moldability of fiber reinforced composite material | Impregnating property with respect to reinforcing fiber | A | A | A | A | A | A |
| | Ease of mold release operation | A | A | A | A | A | B |

| | | Example 25 | Example 26 | Comparative example 12 | Comparative example 13 | Comparative example 14 | Comparative example 15 |
|---|---|---|---|---|---|---|---|
| Epoxy resin composition | [A] Epoxy resin — jER1001 | 75 | 75 | | | | |
| | YD-128 | | | 100 | 100 | 100 | 100 |
| | YDF-170 | | | | | | |
| | CELLOXIDE 2021P | 25 | 25 | | | | |
| | [B] Acid anhydride — HN-5500 | 100 | 100 | 89 | 89 | 89 | |
| | KAYAHARD MCD | | | | | | |
| | [C] Imidazolium salt — 1-butyl-3-methylimidazolium chloride | | | | 4 | 40 | |
| | 1-butyl-3-methylimidazolium bromide | | | | | | |
| | 1-ethyl-3-methylimidazolium bromide | 6 | 22 | | | | |
| | Other substances — 1,2-dimethyl imidazole | | | | | 10 | |
| | 2-ethyl-4-methyl imidazole | | | | | | 10 |
| | H/E ratio | 1.0 | 1.0 | 1.0 | 1.0 | 1.0 | 1.0 |
| Properties of uncured resin | Viscosity of composition at 40° C. during early period (after 1 min. after mixing) [mPa · s] | 191 | 872 | 175 | 4800 | 524 | 2036 |
| | Viscosity of composition at 40° C. after 5 min. after mixing) [mPa · s] | 206 | 1030 | 180 | 6700 | 1100 | 5890 |
| | (ratio to viscosity after 1 min. after mixing) | 1.1 | 1.2 | 1.0 | 1.4 | 2.1 | 2.9 |
| | Viscosity of composition at 40° C. after 20 min. after mixing) [mPa · s] | 248 | 1440 | 193 | 12100 | 2730 | 16500 |
| | (ratio to viscosity after 5 min. after mixing) | 1.2 | 1.4 | 1.1 | 1.8 | 2.5 | 2.8 |
| | t10 at 120° C. [min.] | 2.0 | 1.2 | 3.7 | 0.6 | 0.9 | 1.3 |
| | t90 at 120° C. [min.] | 4.9 | 2.2 | 7.9 | 1.1 | 2.5 | 3.3 |
| Properties of cured resin product | 120° C. cured product's glass transition temperature [° C.] | 128 | 123 | 129 | 114 | 121 | 115 |
| | Cured product coloration | Absent | Absent | Absent | Absent | Present | Present |
| Moldability of fiber reinforced composite material | Impregnating property with respect to reinforcing fiber | A | A | A | C | C | C |
| | Ease of mold release operation | A | A | A | C | B | C |

INDUSTRIAL APPLICABILITY

Our two-component type epoxy resin composition is excellent in the ease of operation at the time of preparation of epoxy resin and excellent in the viscosity stability at a low temperature (e.g., 40° C.) of the epoxy resin composition after the mixture preparation, and cures in a short time at the time of forming, and gives high-quality fiber reinforced composite materials. Therefore, it becomes possible to provide high-quality fiber reinforced composite materials with high productivity by using the RTM process or the like. This promotes the application of the fiber reinforced composite material particularly to the motor vehicle usage so that fuel economy improvement by further weight reduction of motor vehicles and contribution to reduction of global warming gas emissions can be expected.

The invention claimed is:

1. A two-component type epoxy resin composition for a fiber reinforced composite material, consisting of components [A] to [C], and optionally [D], wherein
   component [A]: an epoxy resin
   component [B]: an acid anhydride
   component [C]: a quaternary ammonium salt or a quaternary phosphonium halide or an imidazolium salt,
   component [D]: reinforcing fibers, and
   a content of the component [C] is more than 10 and less than or equal to 25 mass parts relative to 100 mass parts of the component [A] when the component [C] is the quaternary ammonium salt or the quaternary phosphonium halide, and is 18 to 25 mass parts relative to 10 mass parts of the component [A] when the component [C] is the imidazolium salt.

2. The two-component type epoxy resin composition for the fiber reinforced composite material according to claim 1, wherein the component [C] is the quaternary ammonium halide.

3. The two-component type epoxy resin composition for the fiber reinforced composite material according to claim 1, wherein the component [C] is quaternary phosphonium bromide.

4. The two-component type epoxy resin composition for the fiber reinforced composite material according to claim 1, wherein the component [C] is a tetraphenylphosphonium halide.

5. The two-component type epoxy resin composition for the fiber reinforced composite material according to claim 1, wherein the component [C] is an imidazolium halide.

6. The two-component type epoxy resin composition for the fiber reinforced composite material according to claim 1, wherein the component [D] is a carbon fiber.

7. The two-component type epoxy resin composition for the fiber reinforced composite material according to claim 1, wherein the component [B] has an alicyclic structure.

8. A two-component type epoxy resin composition for a fiber reinforced composite material, consisting of components [A] to [C], and optionally [D], wherein
   a content of the component [C] is more than 10 to 25 mass parts relative to 100 mass parts of the component [A]
   component [A]: an epoxy resin
   component [B]: an acid anhydride
   component [C]: a quaternary ammonium halide or a quaternary phosphonium bromide or a tetraphenylphosphonium halide or an imidazolium halide, and
   component [D]: reinforcing fibers.

* * * * *